United States Patent
Kim et al.

(10) Patent No.: US 7,220,066 B2
(45) Date of Patent: May 22, 2007

(54) PLUGGABLE OPTICAL TRANSCEIVER MODULE ASSEMBLY

(75) Inventors: Sung-Min Kim, Suwon-si (KR); Jin-Wook Kwon, Suwon-si (KR)

(73) Assignee: Samsung Electronics Co., Ltd., Suwon-si, Gyeonggi-Do, Korea (KR)

( * ) Notice: Subject to any disclaimer, the term of this patent is extended or adjusted under 35 U.S.C. 154(b) by 118 days.

(21) Appl. No.: 11/179,929

(22) Filed: Jul. 12, 2005

(65) Prior Publication Data

US 2006/0056774 A1    Mar. 16, 2006

(30) Foreign Application Priority Data

Sep. 13, 2004 (KR) ............... 10-2004-0072980

(51) Int. Cl.
*G02B 6/42* (2006.01)
(52) U.S. Cl. .................. 385/92; 385/88; 385/89
(58) Field of Classification Search ............. 385/88–92
See application file for complete search history.

(56) References Cited

U.S. PATENT DOCUMENTS

2003/0044129 A1* 3/2003 Ahrens et al. ............... 385/92
2005/0041933 A1* 2/2005 Meadowcroft et al. ....... 385/92

* cited by examiner

*Primary Examiner*—Frank G. Font
*Assistant Examiner*—Eric Wong
(74) *Attorney, Agent, or Firm*—Cha & Reiter, L.L.C.

(57) ABSTRACT

A latching mechanism, which is configured to enable a pluggable optical transceiver module assembly to be plugged in or unplugged from a cage, is disclosed. The pluggable optical transceiver module assembly includes a bail clip for providing a latching portion locked in a locking member and an optical transceiver module having a connector portion including receptacle portions for accommodating external connectors. The bail clip includes a main body assembled through first and second ends of the connector portion; a lock pin, which is supported by a first end portion of the main body, has the latching portion exposed from or sunk in the second end of the connector portion, and provides a force of restitution to the bail clip; and a bail, one end of which is supported by a second end portion of the main body and which is laid on the first end of the connector portion in a lever shape, sinks the latching portion by giving pressure to the other end, and exposes the latching portion using the force of restitution of the lock pin by removing the pressure from the other end.

17 Claims, 22 Drawing Sheets

PLUGGABLE OPTICAL TRANSCEIVER MODULE ASSEMBLY

CLAIM OF PRIORITY

This application claims priority under 35 U.S.C. § 119 to an application entitled "Pluggable Optical Transceiver Module Assembly," filed in the Korean Intellectual Property Office on Sep. 13, 2004 and assigned Serial No. 2004-72980, the contents of which are incorporated herein by reference.

BACKGROUND OF THE INVENTION

1. Field of the Invention

The present invention relates generally to a pluggable optical transceiver module assembly, and in particular, to a latching mechanism that is configured to enable the pluggable optical transceiver module assembly to be plugged in or unplugged from a cage.

2. Description of the Related Art

With the development of information and communication technologies, high data rate optical communication systems that only use a few communication lines have been developed in order to transmit more information. An optical communication system includes an optical transceiver module for electro-optic conversion and photoelectric conversion. The optical transceiver module includes a light source and an optical detection element. A small form-factor pluggable (SFP) optical transceiver module out of pluggable optical transceiver modules is well known. The SFP optical transceiver module interfaces a host device with an optical fiber cable.

U.S. Pat. No. 6,439,918 entitled "Electronic Module Having an Integrated Latching Mechanism" discloses a latching mechanism used for an SFP optical transceiver module. In order to unplug the SFP optical transceiver module from a cage, an optical fiber connector to which optical fiber cable is connected should be first withdrawn from the SFP optical transceiver module. The SFP optical transceiver module should be pulled in a state where a bail of the latching mechanism is lifted. Since the bail covers the optical fiber connector, the optical fiber connector should be first withdrawn in order to lift the bail.

As described above, the conventional latching mechanism has a structure in which an optical transceiver module cannot be unplugged from a cage in a state in which an optical fiber connector is inserted in the optical transceiver module.

However, since the case where the optical fiber connector should be withdrawn from the cage for test and maintenance activities frequently occurs, in this environment, the conventional latching mechanism is very inconvenient to users.

SUMMARY OF THE INVENTION

One aspect of the present invention relates to a pluggable optical transceiver module that is configured to enable an pluggable optical transceiver module to be unplugged from a cage in a state in which an optical fiber connect is inserted, and a pluggable optical transceiver module assembly using the same.

One embodiment of the present invention is directed to a optical transceiver module assembly that can be plugged in a cage, which is installed in a corresponding port of a host device and has a locking member. The assembly includes a bail clip for providing a latching portion locked in a locking member and an optical transceiver module having a connector portion including receptacle portions for accommodating external connectors. The bail clip includes a main body assembled through first and second ends of the connector portion; a lock pin, which is supported by a first end portion of the main body, has the latching portion exposed from or sunk in the second end of the connector portion, and provides a force of restitution to the bail clip; and a bail, one end of which is supported by a second end portion of the main body and which is laid on the first end of the connector portion in a lever shape, sinks the latching portion by giving pressure to the other end, and exposes the latching portion using the force of restitution of the lock pin by removing the pressure from the other end.

Another embodiment of the present invention is directed to a optical transceiver module assembly that can be plugged in a host device having a locking member. The assembly includes a bail clip for providing a latching portion locked in the locking member; a connector portion having a receptacle portion for accommodating an external connector; and a base portion, which is extended from the connector portion and accommodates a circuit for interfacing the host device with the external connector. The bail clip includes a main body assembled through first and second ends of the connector portion; a lock pin, which is supported by a first end portion of the main body, has the latching portion exposed from or sunk in the second end of the connector portion, and provides a force of restitution to the bail clip; and a bail, one end of which is supported by a second end portion of the main body and which is laid on the first end of the connector portion in a lever shape, sinks the latching portion by giving pressure to the other end, and exposes the latching portion using the force of restitution of the lock pin by removing the pressure from the other end.

BRIEF DESCRIPTION OF THE DRAWINGS

The above and other aspects, features and embodiments of the present invention will become more apparent from the following detailed description when taken in conjunction with the accompanying drawings in which.

DETAILED DESCRIPTION

Figure 1:
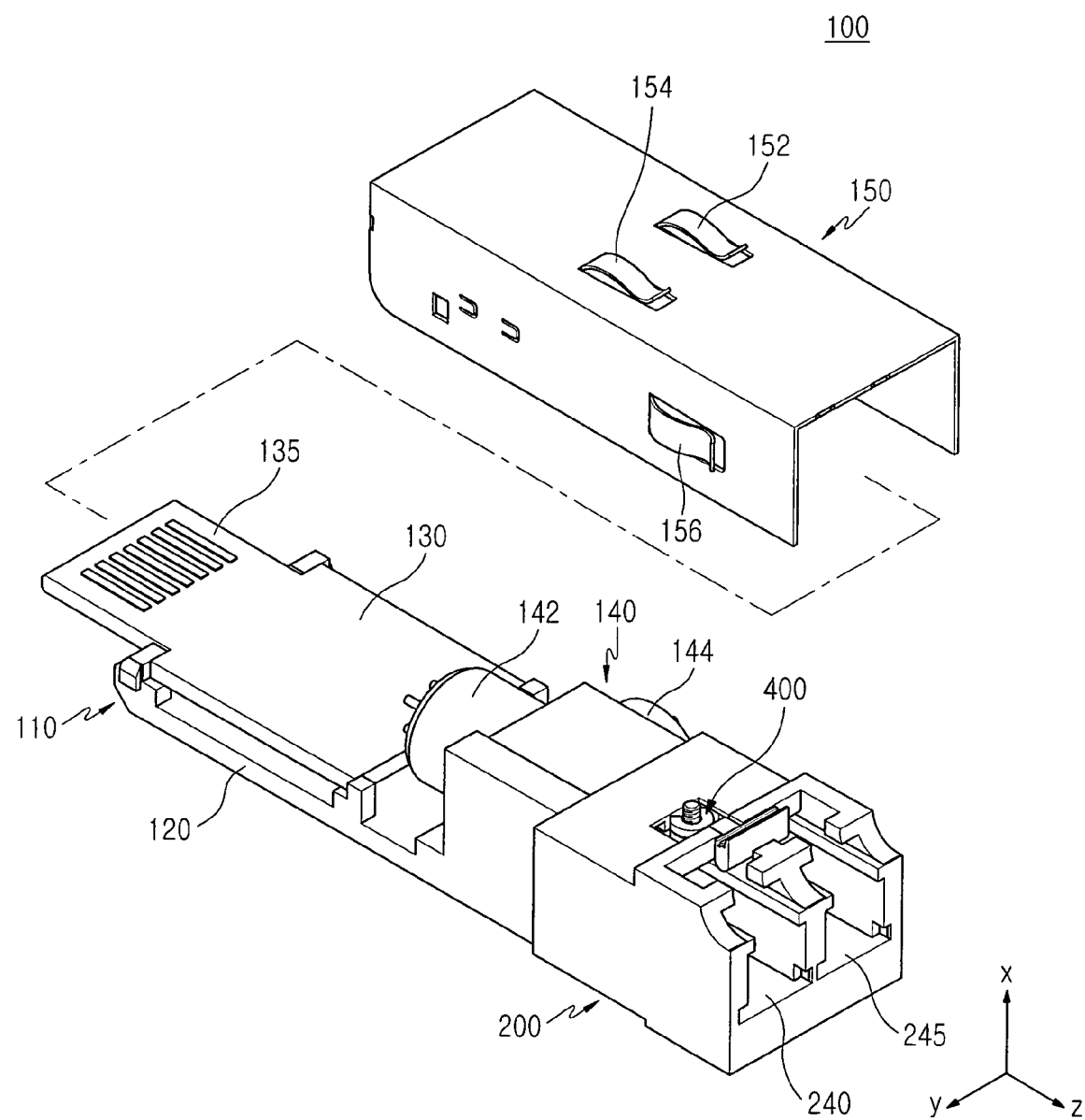
FIG. 1 is a perspective view of a pluggable optical transceiver module assembly according to a first embodiment of the present invention.

Embodiments of the present invention will be described herein below with reference to the accompanying drawings. In the drawings, the same or similar elements are denoted by the same reference numerals even though they are depicted in different drawings. In the following description, well-known functions or constructions are not described in detail since they would obscure the invention in unnecessary detail.

FIG. 1 is a perspective view of a pluggable optical transceiver module assembly 100 according to a first embodiment of the present invention. Referring to FIG. 1, the pluggable optical transceiver module assembly 100 includes a pluggable optical transceiver module 110 and a metal case 150. Hereinafter, an x-axis direction denotes a thickness direction of the pluggable optical transceiver module 110, a y-axis direction denotes a width direction of the pluggable optical transceiver module 110, and a z-axis direction denotes a length direction of the pluggable optical transceiver module 110.

The pluggable optical transceiver module 110 includes a connector portion 200 for accommodating optical fiber connectors, a base portion 120, which is extended in the z-axis direction from a rear portion of the connector portion 200, and a bail clip 400, which is assembled with the connector portion 200 and is a latching mechanism. A printed circuit board (PCB) 130 having an edge connector 135 is assembled with the base portion 120, and the edge connector 135 is connected to an electrical connector located at a corresponding port of a host device (not shown). Also, a bi-directional optical sub assembly (BiDi OSA) 140 is assembled with the base portion 120. The BiDi OSA 140 includes a transmitter optical assembly 142 for electro-optic conversion and a receiver optical assembly 144 for photo-electric conversion.

In this embodiment, the metal case 150 has a rectangular frame structure in which the front end, the rear end, and the bottom end are open and has a plurality of fixing members 152, 154, and 156 on the top surface and both side surfaces. The metal case 150 covers the base portion 120 of the pluggable optical transceiver module 110.

Figure 2:
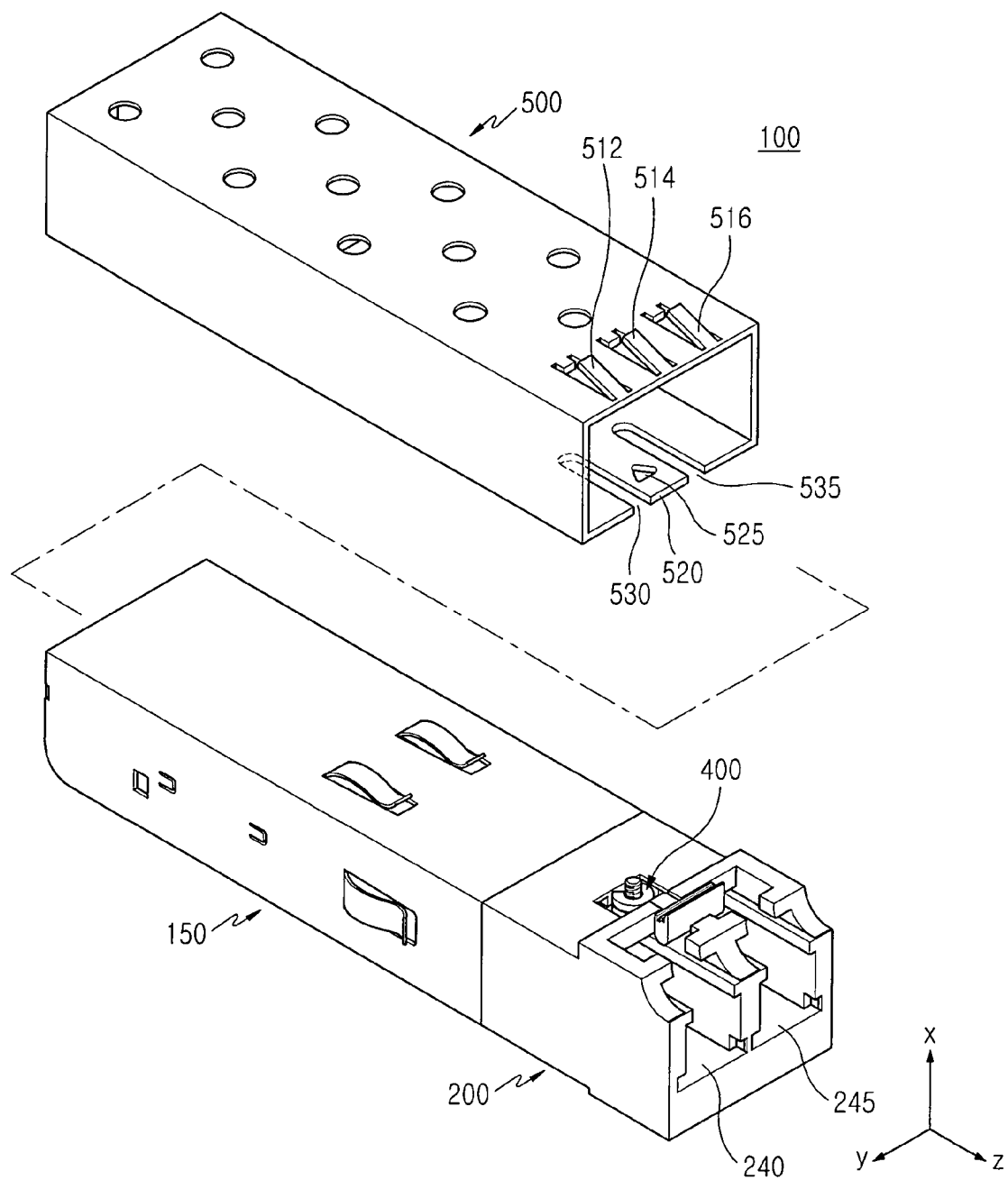
FIG. 2 is a perspective view of a cage and the pluggable optical transceiver module assembly shown in FIG. 1.

FIG. 2 is a perspective view of a cage 500 and the pluggable optical transceiver module assembly 100 shown in FIG. 1.

The cage 500 is assembled with a corresponding port of the host device and has a rectangular frame structure in which the front end and the rear end are open. An open portion is provided in the rear edge of the bottom portion of the cage 500. The cage 500 has a plurality of fixing members 512, 514, and 516 on the top portion. Also, in the bottom portion of the cage 500, the cage 500 has a leaf spring 520, which has a locking hole 525 to lock a lock pin 420 of the bail clip 400 therein, and first and second grooves 530 and 535 for providing the leaf spring 520 to the bottom portion of the cage 500.

The leaf spring 520 is formed by the first and second grooves 530 and 535, which are abreast provided to the bottom portion of the cage 500. The first and second grooves 530 and 535 extend in a direction from the front end to the rear end with a predetermined length and width. The first and second grooves 530 and 535 may has a shape in which the top end, the bottom end, and the front end are open. The locking hole 525 has a triangular shape is formed in the leaf spring 520.

The pluggable optical transceiver module assembly 100 can be inserted into the front end of the cage 500 from the rear end of the pluggable optical transceiver module assembly 100 and engaged with the cage 500 by locking the lock pin 420 of the bail clip 400 in the locking hole 525. When the pluggable optical transceiver module assembly 100 is disengaged from the cage 500, the pluggable optical transceiver module assembly 100 is pulled out in the x-axis direction in a state where the lock pin 420 of the bail clip 400 is unlocked from the locking hole 525. When the pluggable optical transceiver module assembly 100 is disengaged from the cage 500, optical fiber connectors inserted in first and second receptacle portions 240 and 245 do not have to be withdrawn.

Figure 3:
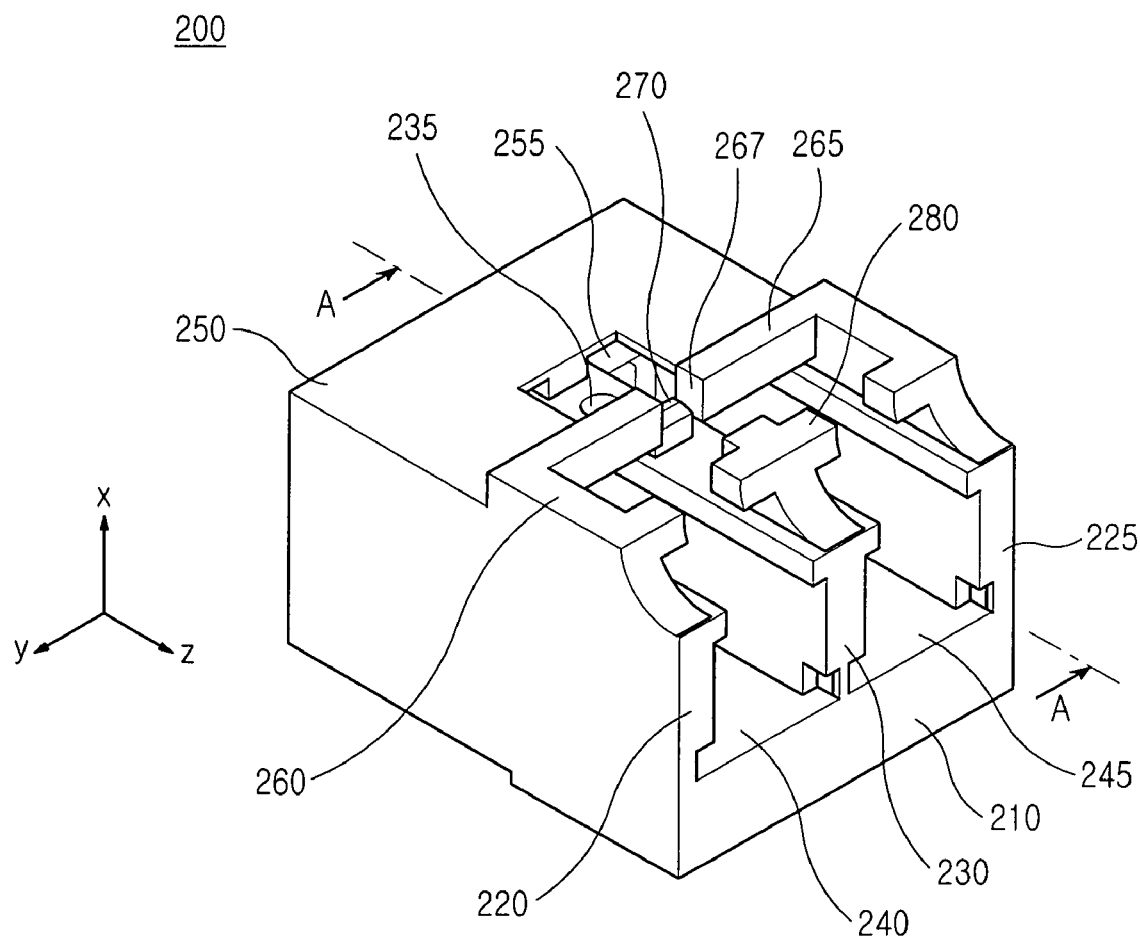
FIG. 3 is a top perspective view of a connector portion, from which a bail clip is disassembled, shown in FIG. 1.

FIG. 3 is a perspective view of only the connector portion 200 of the pluggable optical transceiver module 110, in which a top portion 250 of the connector portion 200 is shown.

Figure 4:
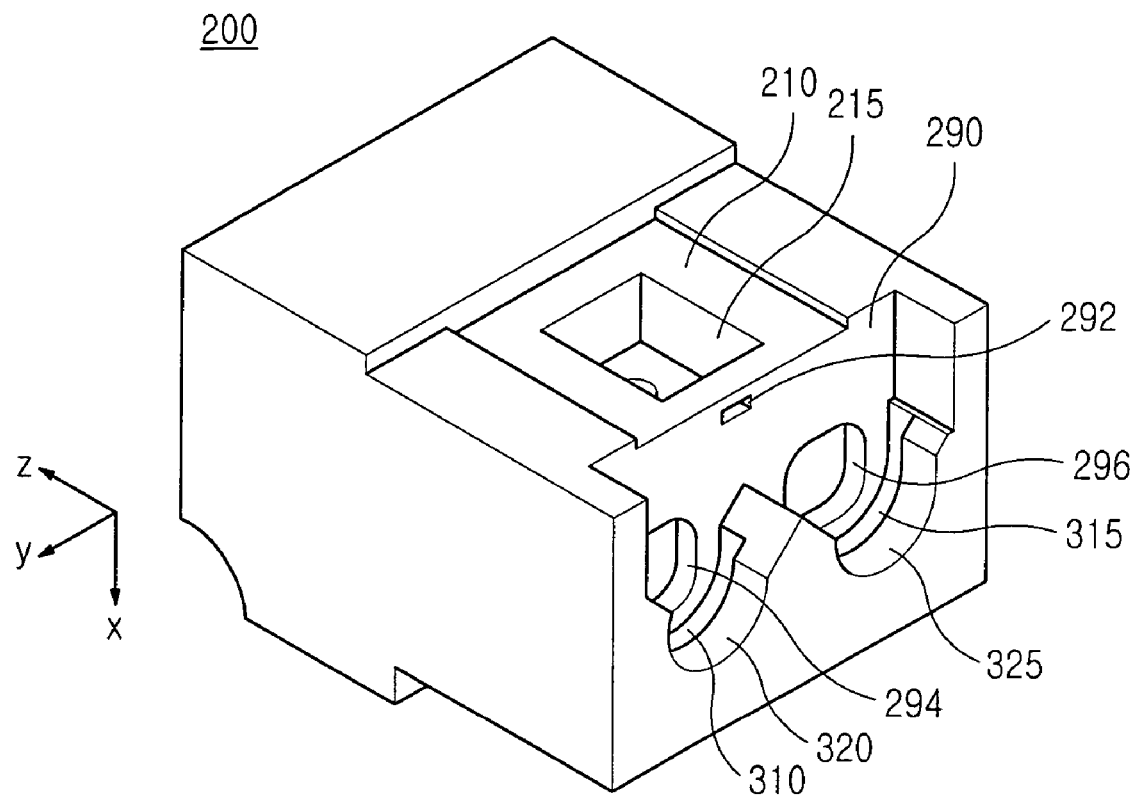
FIG. 4 is a bottom perspective view of the connector portion, from which the bail clip is disassembled, shown in FIG. 1.

FIG. 4 is a perspective view of only the connector portion 200 of the pluggable optical transceiver module 110, in which a bottom portion 210 of the connector portion 200 is shown.

Figure 5:
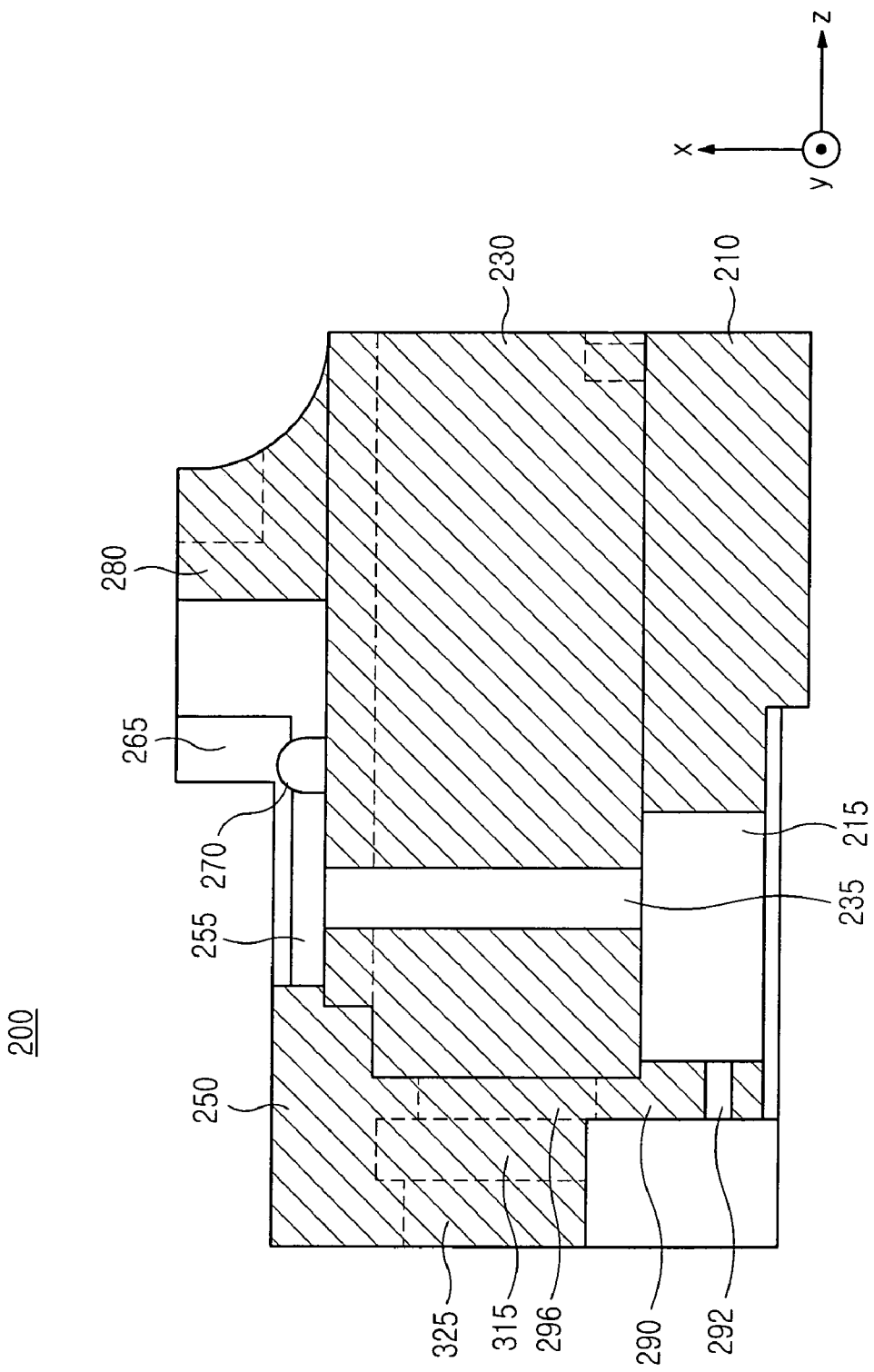
FIG. 5 is a cross-sectional view of the connector portion shown in FIG. 3, such as taken along A–A', which divides the width into halves.

FIG. 5 is a cross-sectional view of the connector portion 200 of the pluggable optical transceiver module 110 shown in FIG. 3, such as taken along A-A', which divides the width into halves.

The connector portion 200 has a structure of symmetrical right and left halves along the y-axis direction and has a rectangular box shape, the front end of which is open. The connector portion 200 includes the bottom portion 210, first and second side portions 220 and 225 extended upward from both side ends of the bottom portion 210, a rear portion 290 closing the rear end of the connector portion 200, the top portion 250, which is extended from the rear end of the connector portion 200, closes a portion of the top end of the connector portion 200, and has the shape of ⊂, and a center portion 230, which is extended upward from the bottom portion 210 at a location at which the width of the connector portion 200 is equally divided into two halves. Due to the center portion 230, the first receptacle portion 240 is provided between the center portion 230 and the first side portion 220, and the second receptacle portion 245 is provided between the center portion 230 and the second side portion 225. Also, the connector portion 200 further includes a second stopper 260, which is extended from the first side portion 220 to the center portion 230 and upward protruded to make a height-level difference at the front end of the top portion 250, a third stopper 265, which is extended from the second side portion 225 to the center portion 230 and upward protruded to make a height-level difference at the front end of the top portion 250, a first stopper 280, which is upward protruded from the top surface of the center portion 230 and extended from the front end of the center portion 230 in the z-axis direction, and a projection 270, which is upward protruded from the top surface of the center portion 230 and formed in a second accommodating space 267 between sections of the second and third stoppers 260 and 265 facing each other.

Since the top portion 250 has the shape of ⊂, a first accommodating space 255 for accommodating the bail clip 400 is provided, and one end of the first accommodating space 255 is closed by the second and third stoppers 260 and 265 and the projection 270. A third accommodating space is provided between the projection 270 and the first stopper 280.

The center portion 230 includes a round-shaped first hole 235 extended from the top end of the center portion 230 to the bottom end, and the first hole 235 communicates with the first accommodating space 255.

The bottom portion 210 includes a rectangular-shaped second hole 215, and the second hole 215 communicates with the first hole 235.

The rear portion 290 includes a rectangular-shaped third hole 292 at the lower part of the rear portion 290, and the third hole 292 communicates with the second hole 215. The rear portion 290 includes round-shaped fourth and fifth holes 294 and 296 locating apart from each other, the fourth hole 294 communicates with the first receptacle portion 240, and the fifth hole 296 communicates with the second receptacle portion 245.

The connector portion 200 extend in the z-axis direction from the rear end of the rear portion 290 and further includes first and second guides 310 and 315, which extend in the shape of a W from locations apart from the fourth and fifth holes 294 and 296. In this embodiment, each of the first and second guides 310 and 315 has a half circular shape.

The connector portion 200 further includes third and fourth guides 320 and 325, which extend in the z-axis direction from the rear ends of the first and second guides 310 and 315 and extend in the shape of a W to make a height-level difference from the first and second guides 310 and 315. In this embodiment, each of the third and fourth guides 320 and 325 has a half circular shape.

Figure 6:
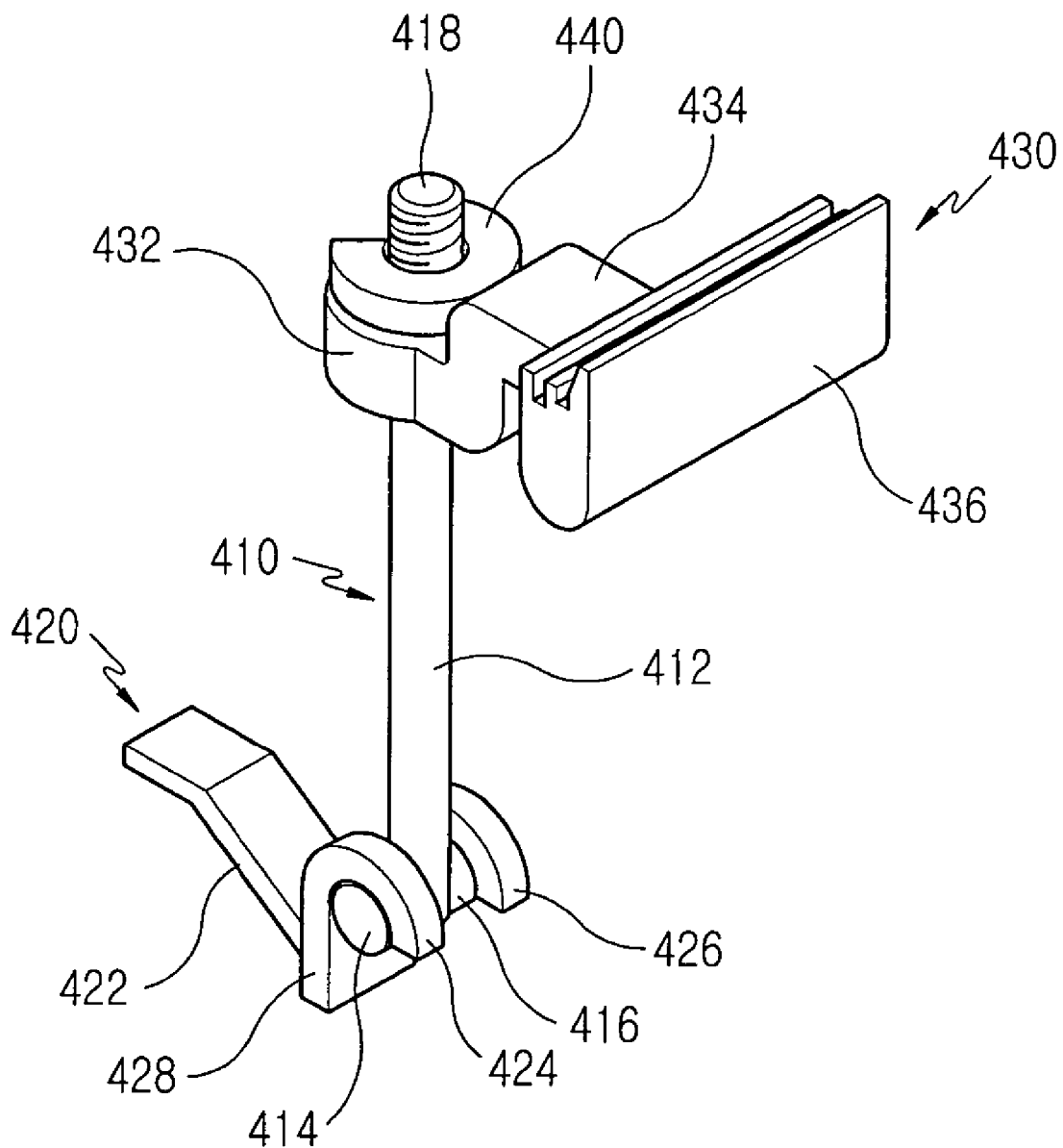
FIG. 6 is a perspective view of the bail clip shown in FIG. 1.

FIG. 6 is a perspective view of the bail clip 400. The bail clip 400 includes a main body 410 having the shape of a T, a bail 430 through which a first end portion of the main body 410 is assembled, a lock pin 420, which is hooked on a second end portion of the main body 410, and a fixing member 440.

In this embodiment, the main body 410 generally has the shape of a T and includes a body portion 412 having a round rod shape, a fixing portion 418, which is formed at a first end portion of the body portion 412 and has a screw thread formed on the surface of the fixing portion 418, first and second supporting portions 414 and 416, which are formed at a second end portion of the body portion 412 and are linearly extended so as to be perpendicular to the body portion 412. In this embodiment, each of the first and second supporting portions 414 and 416 has a round rod shape.

The bail 430 includes a ring portion 432 having a round ring shape, a connecting portion 434, which is bent and extended in a diameter direction from the side of the ring portion 432, and a pressing portion 436, which is connected to the end of the connecting portion 434, has folds on one end, and has a rectangular block shape. The pressing portion 436 is connected to the connecting portion 434 so that the folds are located on the top position.

The fixing member 440 can be screwed to the fixing portion 418 of the main body 410 (screwing method) and limits movement of the bail 430. In a state in which the body portion 412 of the main body 410 is assembled through the ring portion 432 of the bail 430, the movement of the bail 430 in one direction is limited by the first and second supporting portions 414 and 416, and the movement of the bail 430 in the other direction is limited by the fixing member 440.

The lock pin 420 includes a latching portion 428 having a plate shape, an elastic portion 422, which extends to slope outward from the surface of the latching portion 428 in a direction from a first end of the latching portion 428 to a second end and the end portion of which is bent, and first and second hooking portions 424 and 426, which curve in the shape of a C in a direction from the second end of the latching portion 428 to the first end and are extended apart from each other. The elastic portion 422 has elasticity and can be curved in a direction of the first end of the latching portion 428.

Figure 7:
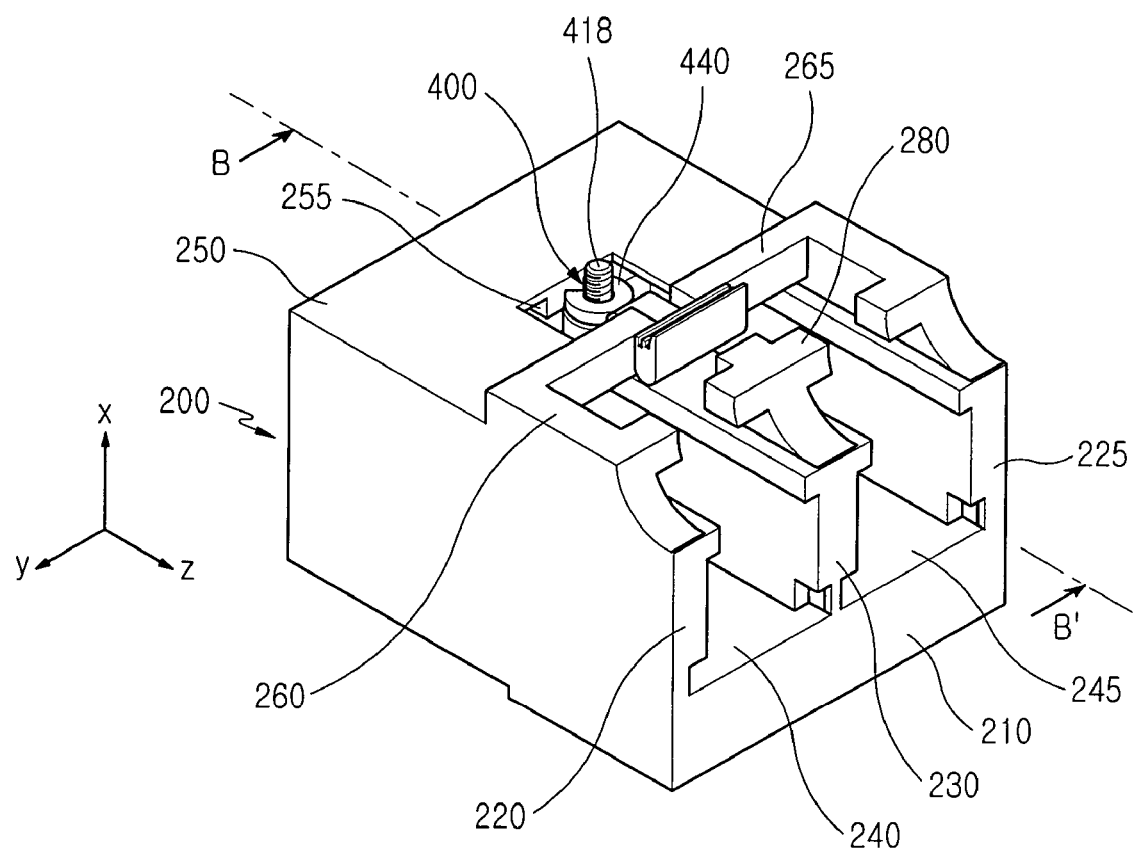
FIG. 7 is a top perspective view of a connector portion, with which a bail clip is assembled, shown in FIG. 1.

FIG. 7 is a perspective view of only the connector portion 200 of the pluggable optical transceiver module 110 with which the bail clip 400 is assembled, in which the top portion 250 of the connector portion 200 is shown.

Figure 8:
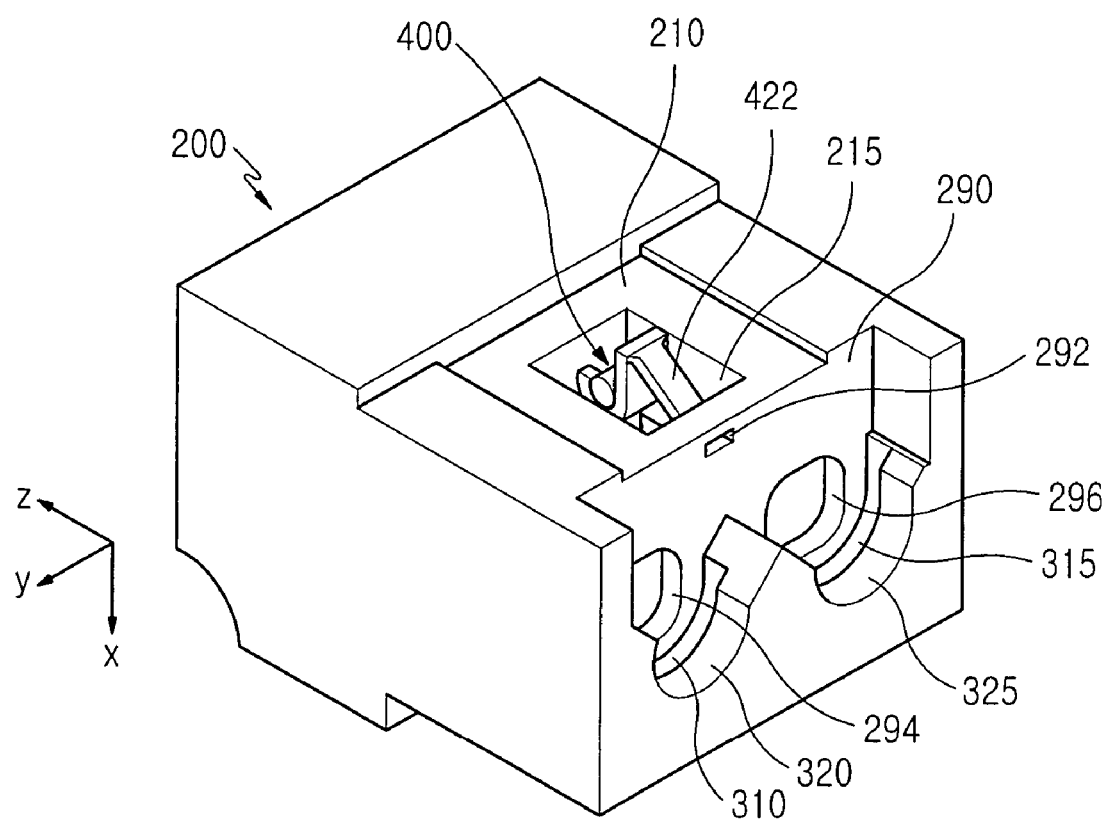
FIG. 8 is a bottom perspective view of the connector portion shown in FIG. 7.

FIG. 8 is a perspective view of only the connector portion 200 of the pluggable optical transceiver module 110 with which the bail clip 400 is assembled, in which the bottom portion 210 of the connector portion 200 is shown.

Figure 9:
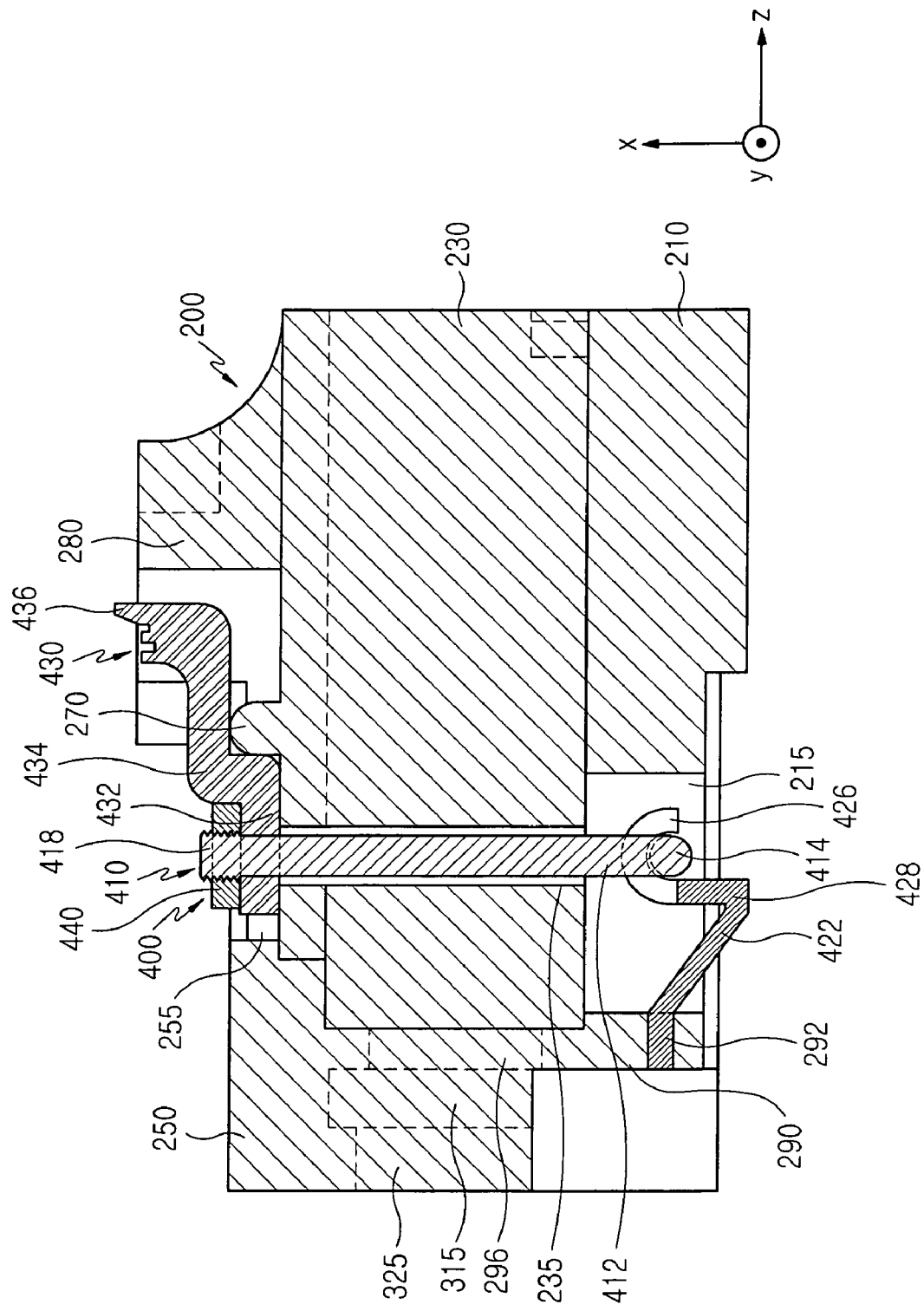
FIG. 9 is a cross-sectional view of the connector portion shown in FIG. 7, such as taken along B–B', which divides the width into halves.

FIG. 9 is a cross-sectional view of the connector portion 200 of the pluggable optical transceiver module 110 shown in FIG. 7, such as taken along B–B', which divides the width into halves.

An assembling sequence of the bail clip 400 will now be described.

First, the bent portion of the elastic portion 422 of the lock pin 420 is inserted into the third hole 292 of the connector portion 200 and fixed.

Second, the main body 410 is inserted into the connector portion 200 so that the fixing portion 418 of the main body 410 passes through between the first and second hooking portions 424 and 426 of the lock pin 420 and through the first hole 235 of the connector portion 200 and is exposed from the top of the center portion 230.

Third, the bail 430 is assembled with the main body 410 so that the main body 410 passes through the ring portion 432 of the bail 430.

Fourth, the fixing member 440 is fixed to the fixing portion 418 of the main body 410.

As shown in FIG. 9, the main body 410 passes through the first hole 235, and the ring portion 432 of the bail 430 and the fixing member 440 are piled up on the top of the center portion 230. The bail 430 is laid on the first accommodating space 255 and the second accommodating space 267, and the pressing portion 436 of the bail 430 is placed in the third accommodating space between the projection 270 and the first stopper 280. The connecting portion 434 of the bail 430 is laid on the projection 270, and the pressing portion 436 is exposed from the top surface of the first stopper 280. Also, a portion of the bail clip 400 placed in the first accommodating space 255 is exposed out of the first accommodating space 255.

The first and second hooking portions 424 and 426 of the lock pin 420 are hooked on the first and second supporting portions 414 and 416 of the main body 410, respectively, and the latching portion 428 of the lock pin 420 is exposed out of the second hole 215 of the connector portion 200.

Figure 10:
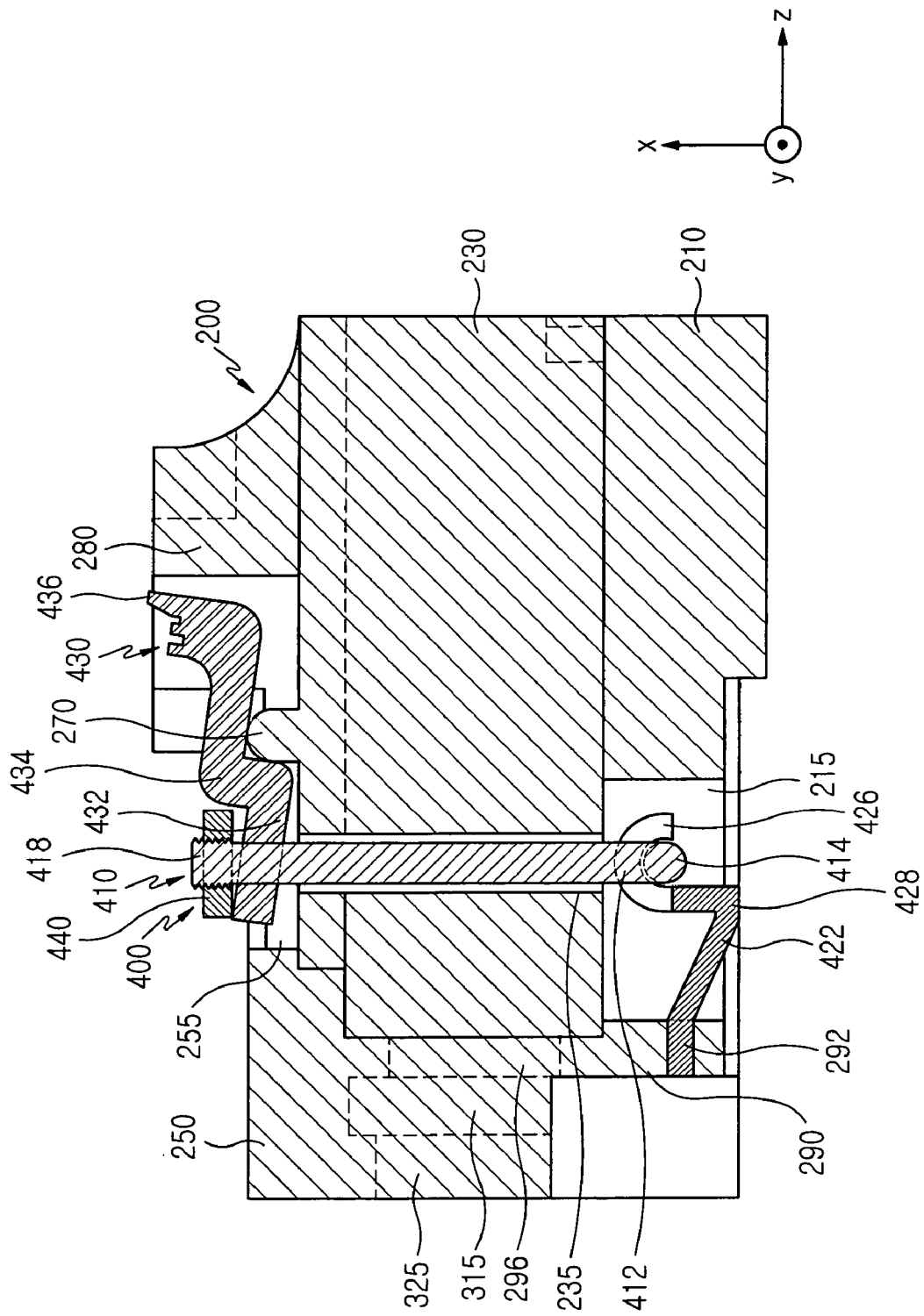
FIG. 10 is a cross-sectional view illustrating an operating method of the bail clip shown in FIG. 9.

FIG. 10 is a cross-sectional view illustrating an operating method of the bail clip 400 shown in FIG. 9.If a user pushes the pressing portion 436 of the bail 430 downward using a finger, the ring portion 432 of the bail 430 is lifted to slope upward from the center portion 230 according to a lever principle. Since the ring portion 432 pushes the fixing member 440 upward, the main body 410 fixed to the fixing member 440 is moved upward. If the main body 410 moves upward, the latching portion 428 of the lock pin 420 is in the second hole 215 of the connector portion 200 by being moved upward by the first and second hooking portions 424 and 426 hooked on the first and second supporting portions 414 and 416 of the main body 410. Before the movement, the latching portion 428 was exposed out of the second hole 215 of the connector portion 200; however, after the movement, the latching portion 428 is sunk into the second hole 215. When the latching portion 428 and the first and second hooking portions 424 and 426 move upward, the elastic portion 422 is curved, and a force of restitution is generated. When the user takes the finger off from the pressing portion 436, the bail clip 400 is restored as shown in FIG. 9 by the force of restitution of the elastic portion 422.

Figure 11:
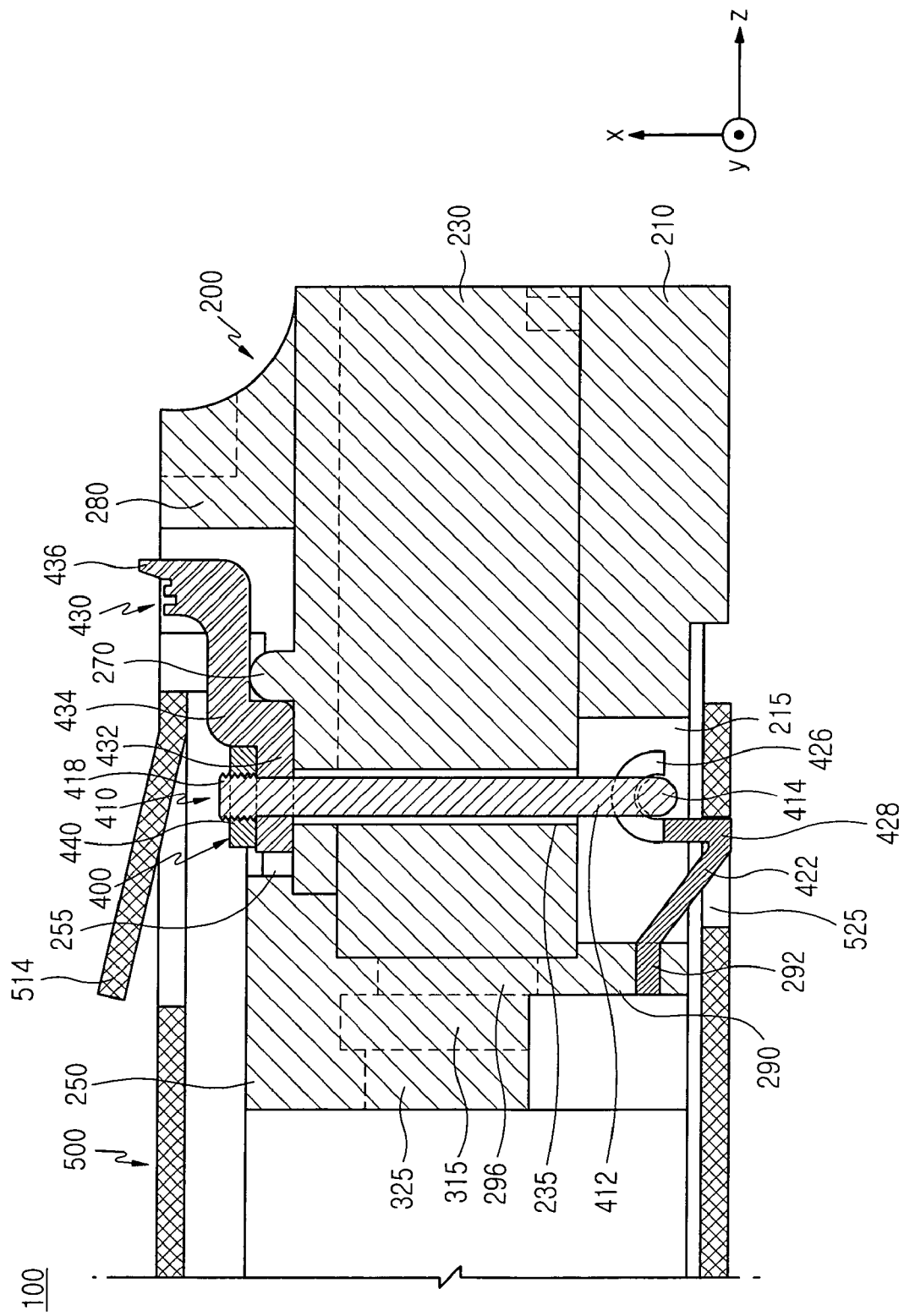
FIG. 11 is a cross-sectional view illustrating a state in which the pluggable optical transceiver module assembly shown in FIG. 1 is engaged with the cage.
Figure 12:
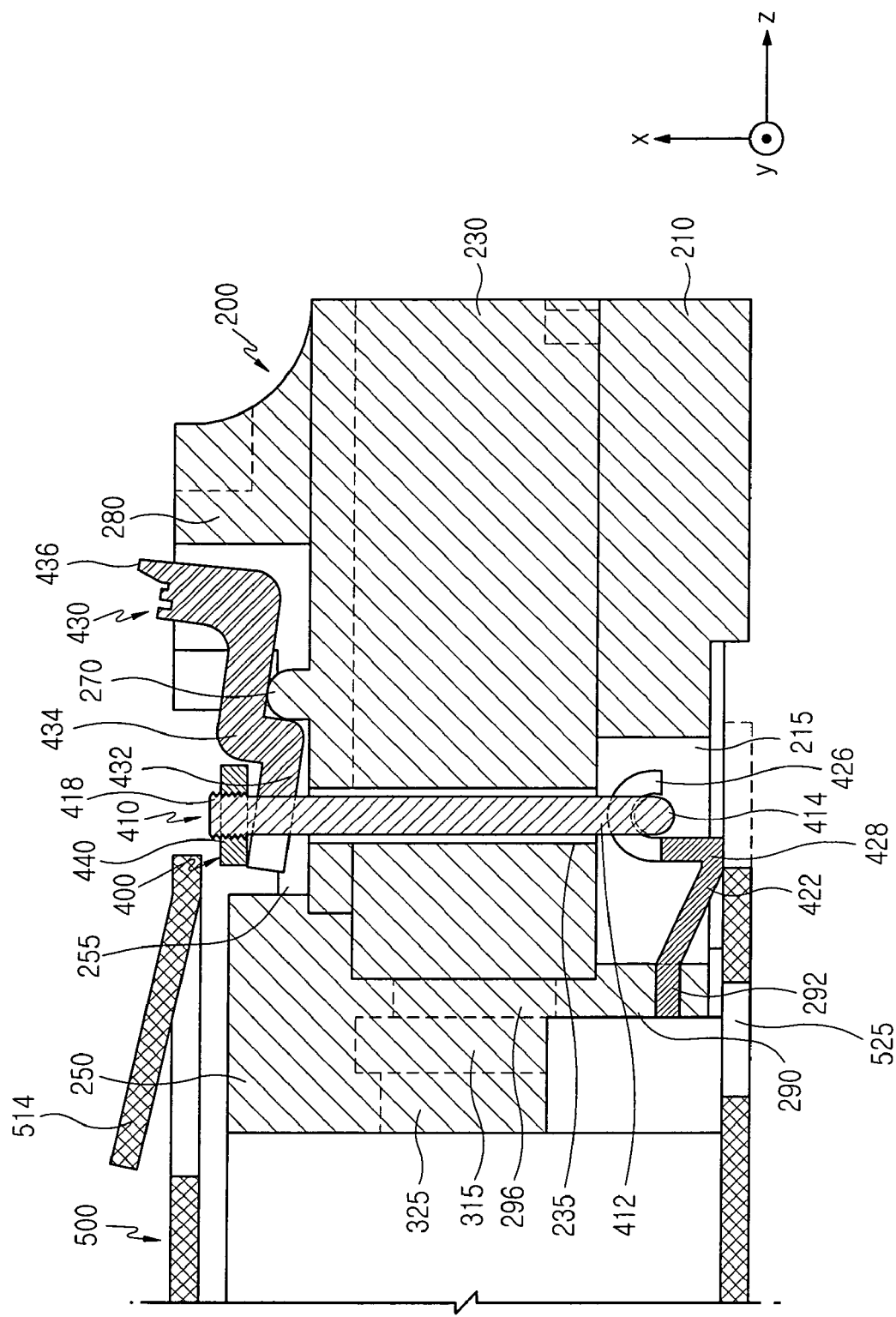
FIG. 12 is a cross-sectional view illustrating a state in which the pluggable optical transceiver module assembly shown in FIG. 1 is disengaged from the cage.

FIGS. 11 and 12 illustrate methods of engaging the pluggable optical transceiver module assembly 100 with and disengaging it from the cage 500. FIG. 11 is a cross-sectional view illustrating a state in which the pluggable optical transceiver module assembly 100 is engaged with the cage 500, and FIG. 12 is a cross-sectional view illustrating a process of disengaging the pluggable optical transceiver module assembly 100 from the cage 500.

Referring to FIG. 11, the pluggable optical transceiver module assembly 100 is inserted into the front end of the cage 500 from the rear end of the pluggable optical transceiver module assembly 100 and engaged with the cage 500 by locking the lock pin 420 of the bail clip 400 in the locking hole 525. The top portion of the cage 500 is apart from the top end of the connector portion 200 in order to provide space for the bail clip 400 exposed out of the first accommodating space 255 in an engaging process of the pluggable optical transceiver module assembly 100. In the engaging process of the pluggable optical transceiver module assembly 100, the front end of the cage 500 is contacted to the elastic portion 422 of the bail clip 400.Since the elastic portion 422 slopes against the surface of the cage 500, if the pluggable optical transceiver module assembly 100 is continuously pushed in the z-axis direction, the elastic portion 422 is curved, and the latching portion 428 is gradually sunk into the second hole 215. If the pluggable optical transceiver module assembly 100 is further pushed in the z-axis direction, the latching portion 428 is completely sunk into the second hole 215, and if the movement is stopped since the second and third stoppers 260 and 265 are contacted to the cage 500, the latching portion 428 is exposed out of the second hole 215 and locked in the locking hole 525.

Referring to FIG. 12, if a user pushes the pressing portion 436 of the bail 430 downward using a finger, the latching portion 428 is completely sunk into the second hole 215 as described above. When the user pulls the pluggable optical transceiver module assembly 100 out in a state in which the latching portion 428 is completely sunk in the second hole 215, the pluggable optical transceiver module assembly 100 is disengaged from the cage 500.

FIGS. 13 through 20 illustrate a pluggable optical transceiver module assembly according to a second embodiment of the present invention. Since the pluggable optical transceiver module assembly includes a case, which is the same as shown in FIG. 1, and a pluggable optical transceiver module in which only a connector portion 600 is different, duplicated drawings and descriptions are omitted.

The pluggable optical transceiver module includes the connector portion 600 for accommodating an optical fiber connector, a base portion, which is extended in the z-axis direction from a rear portion of the connector portion 600, and a bail clip 800, which is assembled with the connector portion 600. A PCB having an edge connector is assembled with the base portion, and the edge connector is connected to an electrical connector located at a corresponding port of a host device (not shown). A BiDi OSA is assembled with the base portion. The BiDi OSA includes a transmitter optical assembly for electro-optic conversion and a receiver optical assembly for photoelectric conversion.

Figure 13:
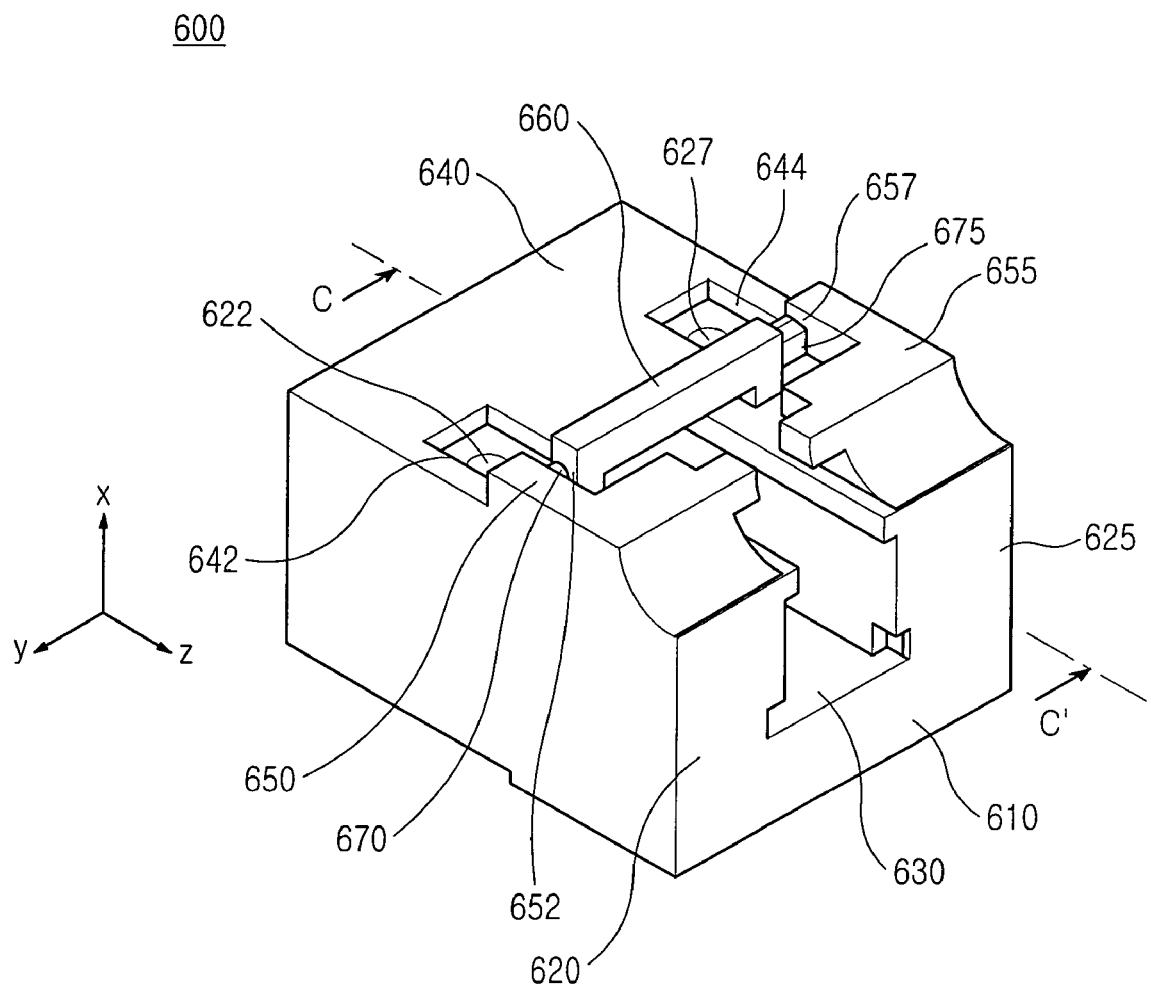
FIG. 13 is a top perspective view of a connector portion from which a bail clip is disassembled according to a second embodiment of the present invention.

FIG. 13 is a perspective view of the connector portion 600 of the pluggable optical transceiver module, in which a top portion 640 of the connector portion 600 is shown.

Figure 14:
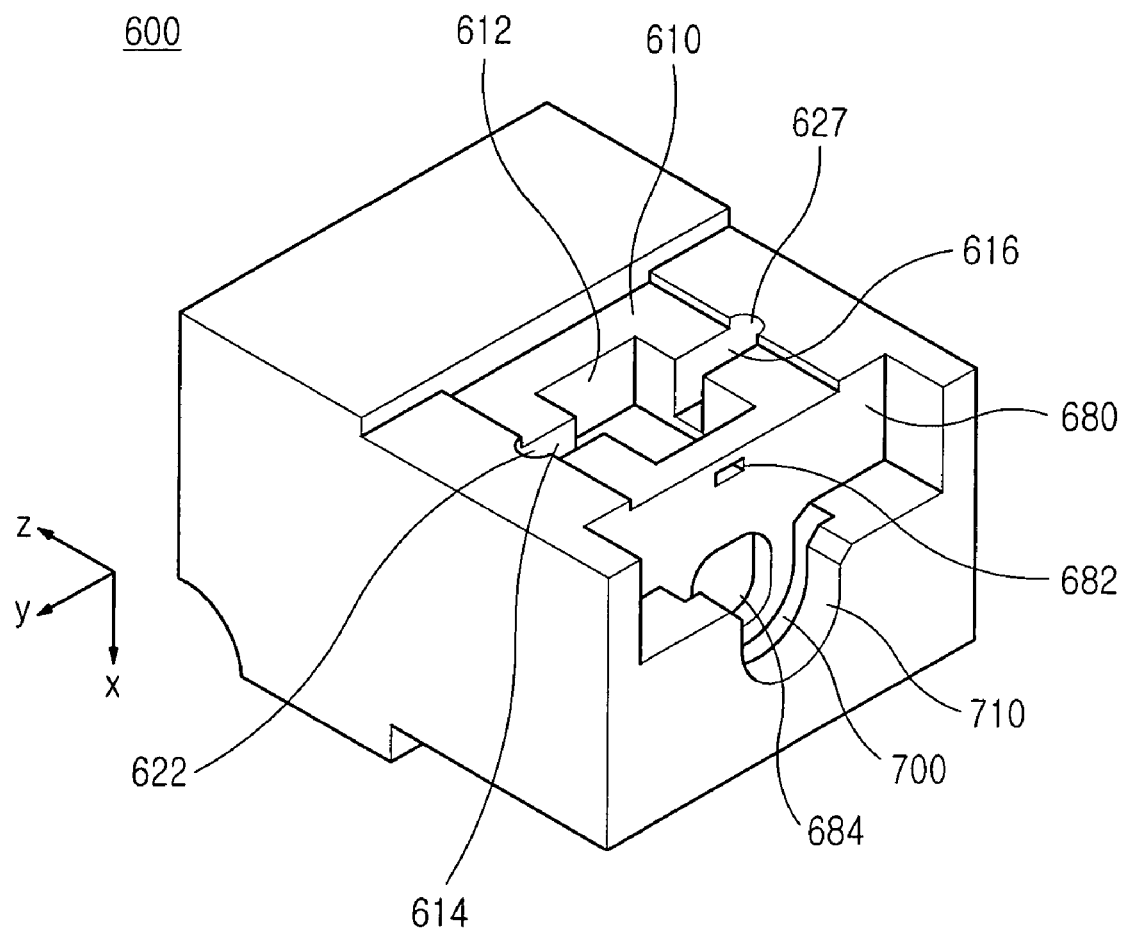
FIG. 14 is a bottom perspective view of the connector portion shown in FIG. 13.

FIG. 14 is a perspective view of the connector portion 600 of the pluggable optical transceiver module, in which a bottom portion 610 of the connector portion 600 is shown.

Figure 15:
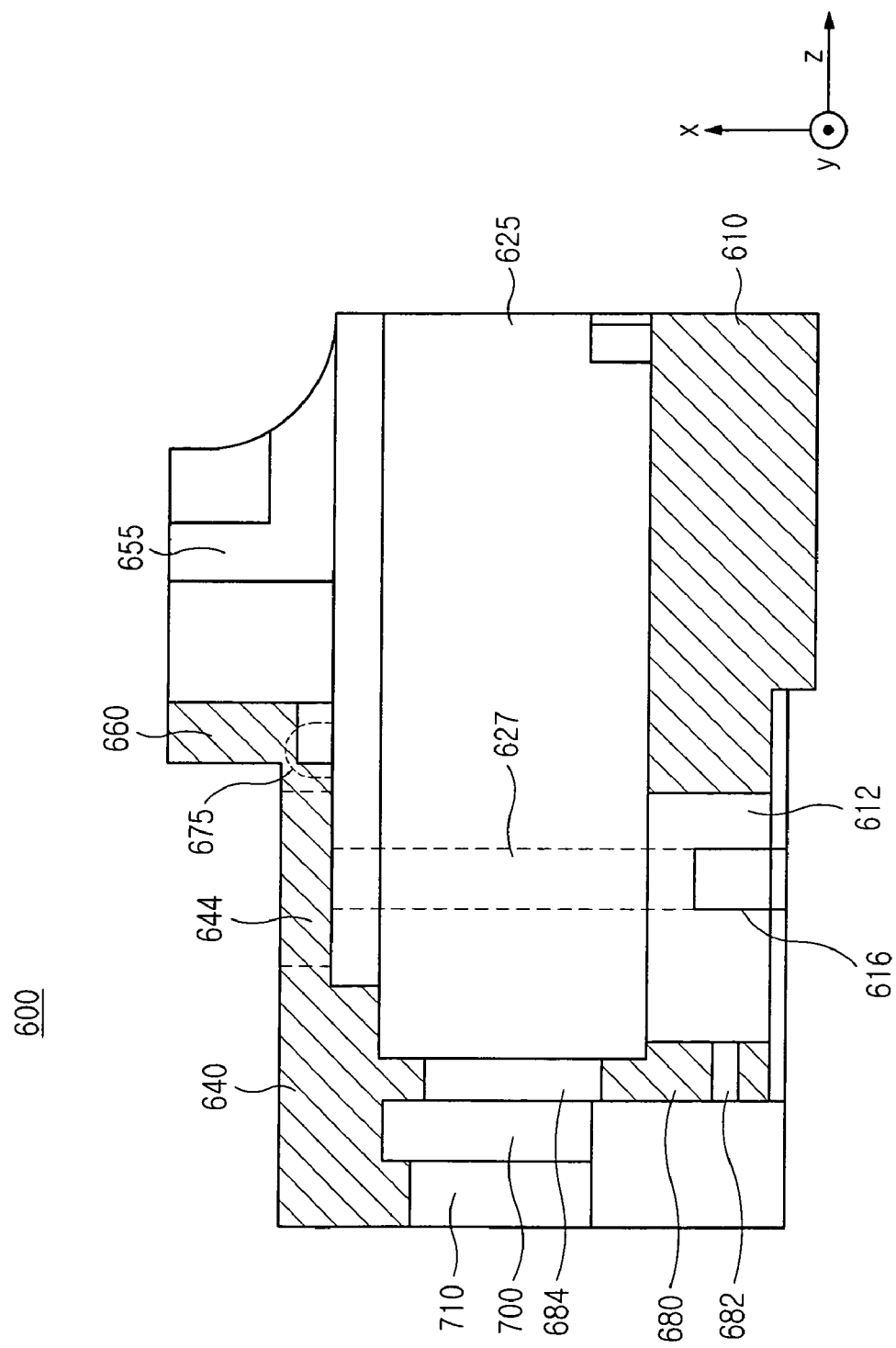
FIG. 15 is a cross-sectional view of the connector portion shown in FIG. 13, such as taken along C–C', which divides the width into halves.

FIG. 15 is a cross-sectional view of the connector portion 600 of the pluggable optical transceiver module shown in FIG. 13, such as taken along C–C', which divides the width into halves.

The connector portion 600 has a structure of symmetrical right and left halves along the y-axis direction and has a rectangular box shape, the front end of which is open. The connector portion 600 includes the bottom portion 610 located at the bottom, first and second side portions 620 and 625 extend upward from both side ends of the bottom portion 610, a rear portion 680 closing the rear end of the connector portion 600, and the top portion 640, which extends from the rear end of the connector portion 600, closes a portion of the top end of the connector portion 600, and has the shape of an E. A receptacle portion 630 is provided between the first side portion 620 and the second side portion 625. The connector portion 600 further includes a second stopper 650, which protrudes upwards from the first side portion 620 to make a height-level difference at the front end of the top portion 640, a third stopper 655, which protrudes upwards from the second side portion 625 to make a height-level difference at the front end of the top portion 640, a first stopper 660, which extends from the top surface of the first side portion 620 to the top surface of the second side portion 625, a first projection 670, which protrudes upwards from the top surface of the first side portion 620 and formed in a first accommodating space 652 between sections of the first and second stoppers 660 and 650 facing each other, and a second projection 675, which protrudes upwards from the top surface of the second side portion 625 and formed in a second accommodating space 657 between sections of the first and third stoppers 660 and 655 facing each other.

Since, in this embodiment, the top portion 640 has the shape of an E, first and second accommodating grooves 642 and 644 for accommodating the bail clip 800 is provided.

The first accommodating groove 642 extends from the top end of the top portion 640 to the top surface of the first side portion 620, and the second accommodating groove 644 extends from the top end of the top portion 640 to the top surface of the second side portion 625. One end of the first accommodating groove 642 is closed by the first and second stoppers 660 and 650 and the first projection 670, and one end of the second accommodating groove 644 is closed by the first and third stoppers 660 and 655 and the second projection 675. Since, in this embodiment, the second stopper 650 is bent in the shape of an L, a third accommodating space is provided between the first projection 670 and the second stopper 650, and since the third stopper 655 is also bent in the shape of an L, a fourth accommodating space is provided between the second projection 675 and the third stopper 655.

The first side portion 620 includes a round-shaped first hole 622 extended from the top end of the first side portion 620 to the bottom end, and the first hole 622 communicates with the first accommodating groove 642. The second side portion 625 includes a round-shaped second hole 627 extended from the top end of the second side portion 625 to the bottom end, and the second hole 627 communicates with the second accommodating groove 644.

The bottom portion 610 includes a rectangular-shaped third hole 612, and the third hole 612 communicates with the receptacle portion 630. The bottom portion 610 further includes a third accommodating groove 614, which extends in a predetermined depth from the bottom end of the bottom portion 610 in order to make the first hole 622 and the third hole 612 separated from each other communicate with each other, and a fourth accommodating groove 616, which extends in a predetermined depth from the bottom end of the bottom portion 610 in order to make the second hole 627 and the third hole 612 separated from each other communicate with each other.

The rear portion 680 includes a rectangular-shaped fourth hole 682 at the lower part of the rear portion 680, and the fourth hole 682 communicates with the third hole 612. The rear portion 680 also includes a round-shaped fifth hole 684, and the fifth hole 684 communicates with the receptacle portion 630.

The connector portion 600 extends in the z-axis direction from the rear portion 680 and further includes a first guide 700, which extends in the shape of a half circle from a location apart from the fifth hole 684.

The connector portion 600 further includes a second guide 710, which extends in the z-axis direction from the rear end of the first guide 700 and extends in the shape of a half circle to make a height-level difference from the first guide 700.

Figure 16:
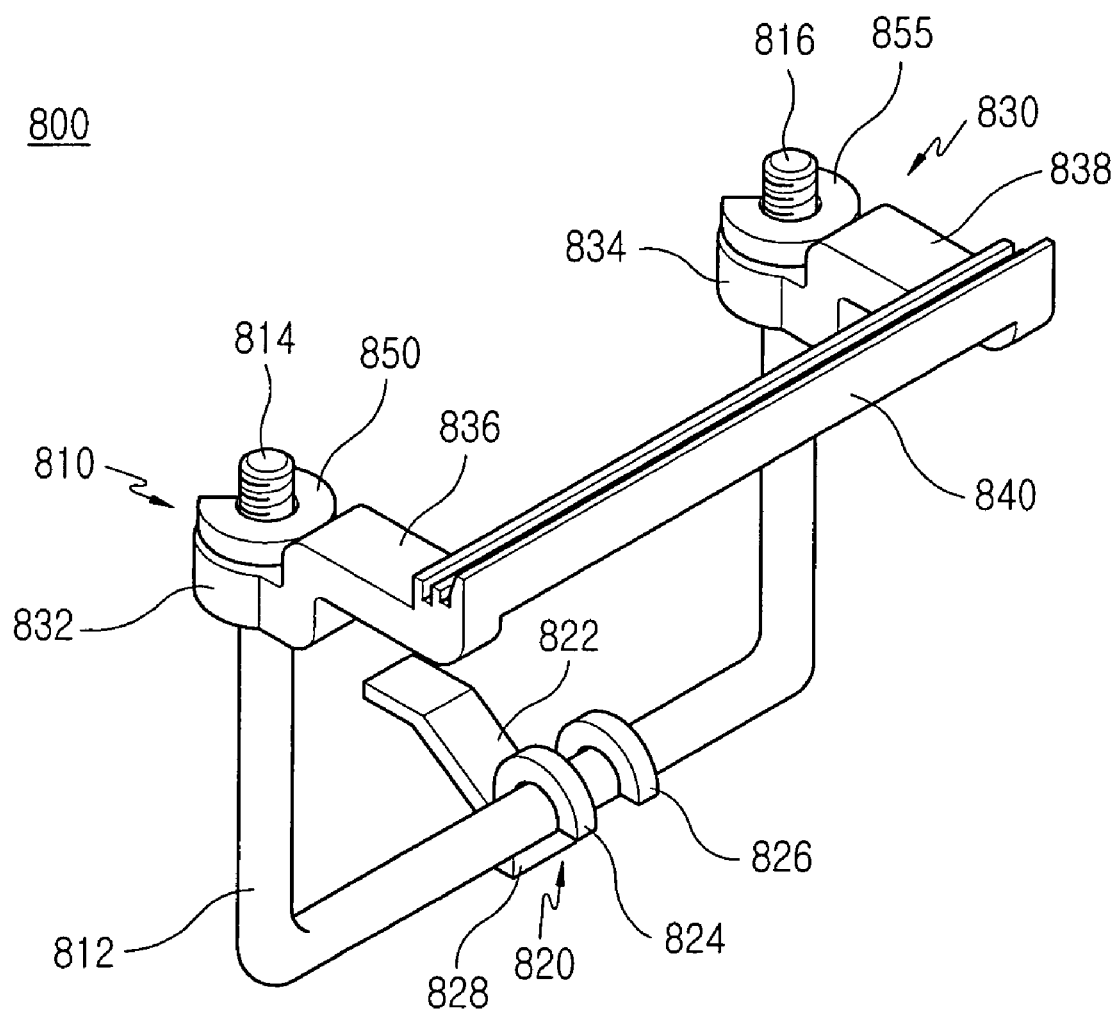
FIG. 16 is a perspective view of the bail clip according to the second embodiment of the present invention.

FIG. 16 is a perspective view of the bail clip 800. In this embodiment, the bail clip 800 includes a main body 810 having the shape of a U, a bail 830 through which both ends of the main body 810 is assembled, a lock pin 820, which is hooked on a center portion of the main body 810, and first and second fixing members 850 and 855.

In this embodiment, the main body 810 generally has the shape of a U and includes a body portion 812 having a round rod shape, a first fixing portion 814, which is formed at a first end portion of the body portion 812 and has a screw thread formed on the surface of the first fixing portion 814, and a second fixing portion 816, which is formed at a second end portion of the body portion 812 and has a screw thread formed on the surface of the second fixing portion 816.

The bail 830 includes first and second ring portions 832 and 834 having a round ring shape, a first connecting portion 836, which is bent and extended in a diameter direction from the side of the first ring portion 832, a second connecting portion 838, which is bent and extended in a diameter direction from the side of the second ring portion 834, and a pressing portion 840, which connects the first and second connecting portions 836 and 838, has folds on one end, and has a rectangular block shape. The pressing portion 840 is connected to the first and second connecting portions 836 and 838 so that the folds are located on the top position.

Movement of the bail 430 is limited by the first fixing member 850, which can be screwed to the first fixing portion 814 of the main body 810, and the second fixing member 855, which can be screwed to the second fixing portion 816 of the main body 810. In a state in which the body portion 812 of the main body 810 are assembled through the first and second ring portions 832 and 834 of the bail 430, the movement of the bail 830 in one direction is limited by both bending portions of the body portion 812, and the movement of the bail 430 in the other direction is limited by the first and second fixing members 850 and 855.

The lock pin 820 includes a latching portion 828 having a plate shape, an elastic portion 822, which extends to slope outward from the surface of the latching portion 828 in a direction from a first end of the latching portion 828 to a second end and the end portion of which is bent, and first and second hooking portions 824 and 826, which curve in the shape of a C in a direction from the second end of the latching portion 828 to the first end and extend apart from each other. The first and second hooking portions 824 and 826 are hooked on the center portion of the body portion 812. The elastic portion 822 has elasticity and can be curved in a direction of the first end of the latching portion 828.

Figure 17:
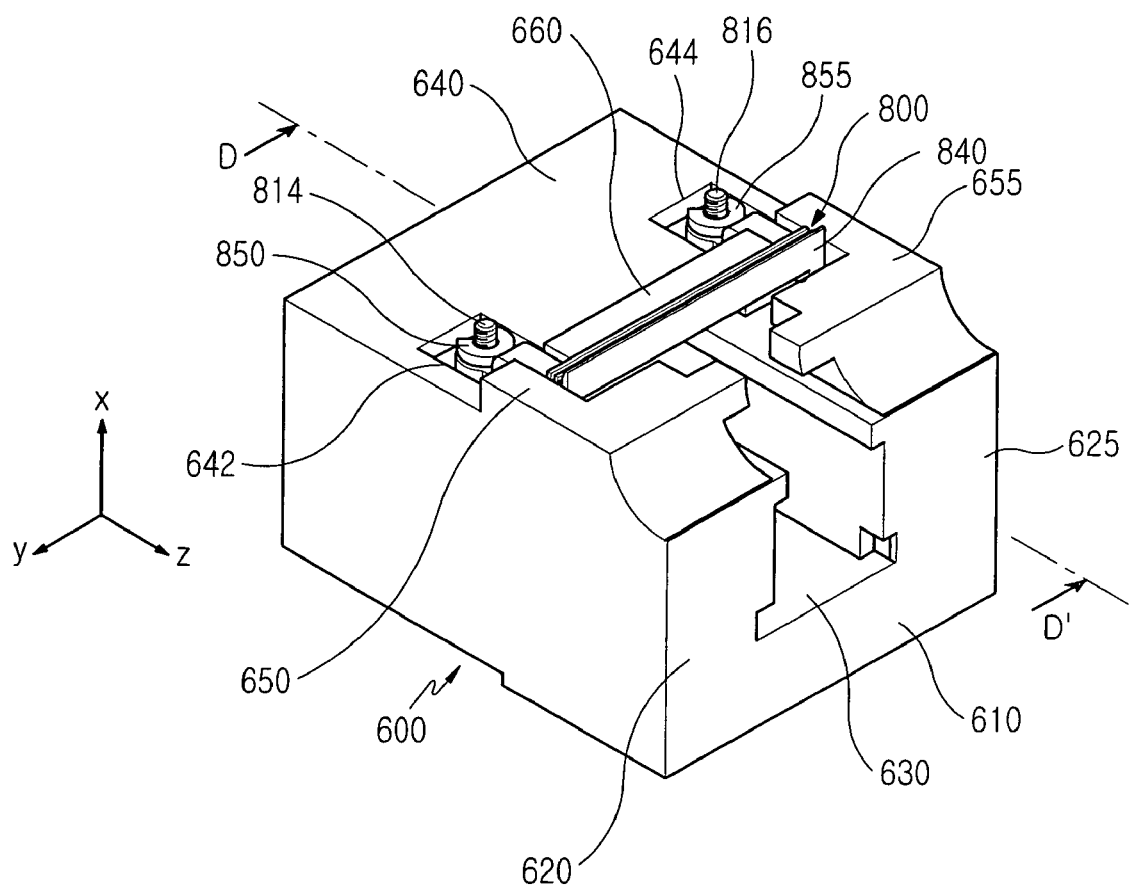
FIG. 17 is a perspective view illustrating a state in which the bail clip shown in FIG. 16 is assembled with the connector portion shown in FIG. 13.

FIG. 17 is a perspective view of only the connector portion 600 of the pluggable optical transceiver module with which the bail clip 800 is assembled, in which the top portion 640 of the connector portion 600 is shown.

Figure 18:
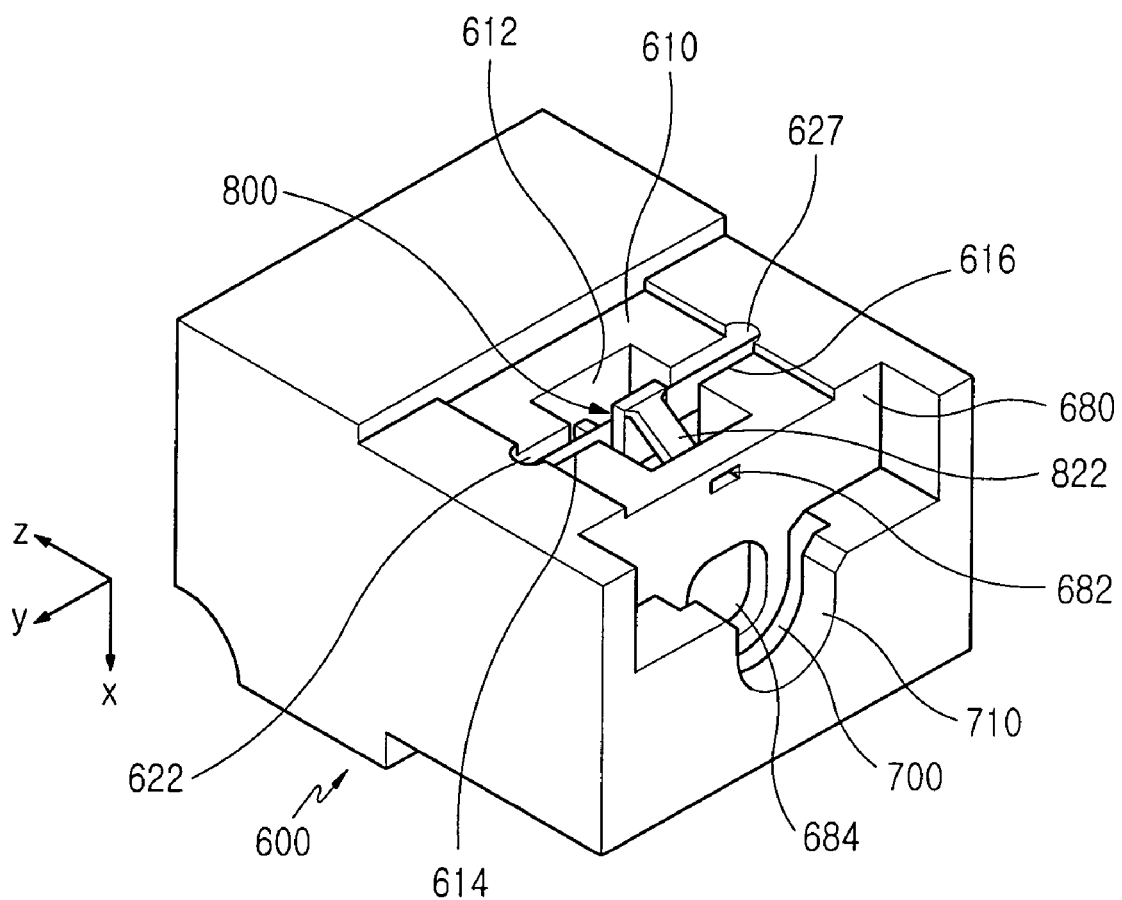
FIG. 18 is a bottom perspective view of the connector portion shown in FIG. 17.

FIG. 18 is a perspective view of only the connector portion 600 of the pluggable optical transceiver module with which the bail clip 800 is assembled, in which the bottom portion 610 of the connector portion 600 is shown.

Figure 19:
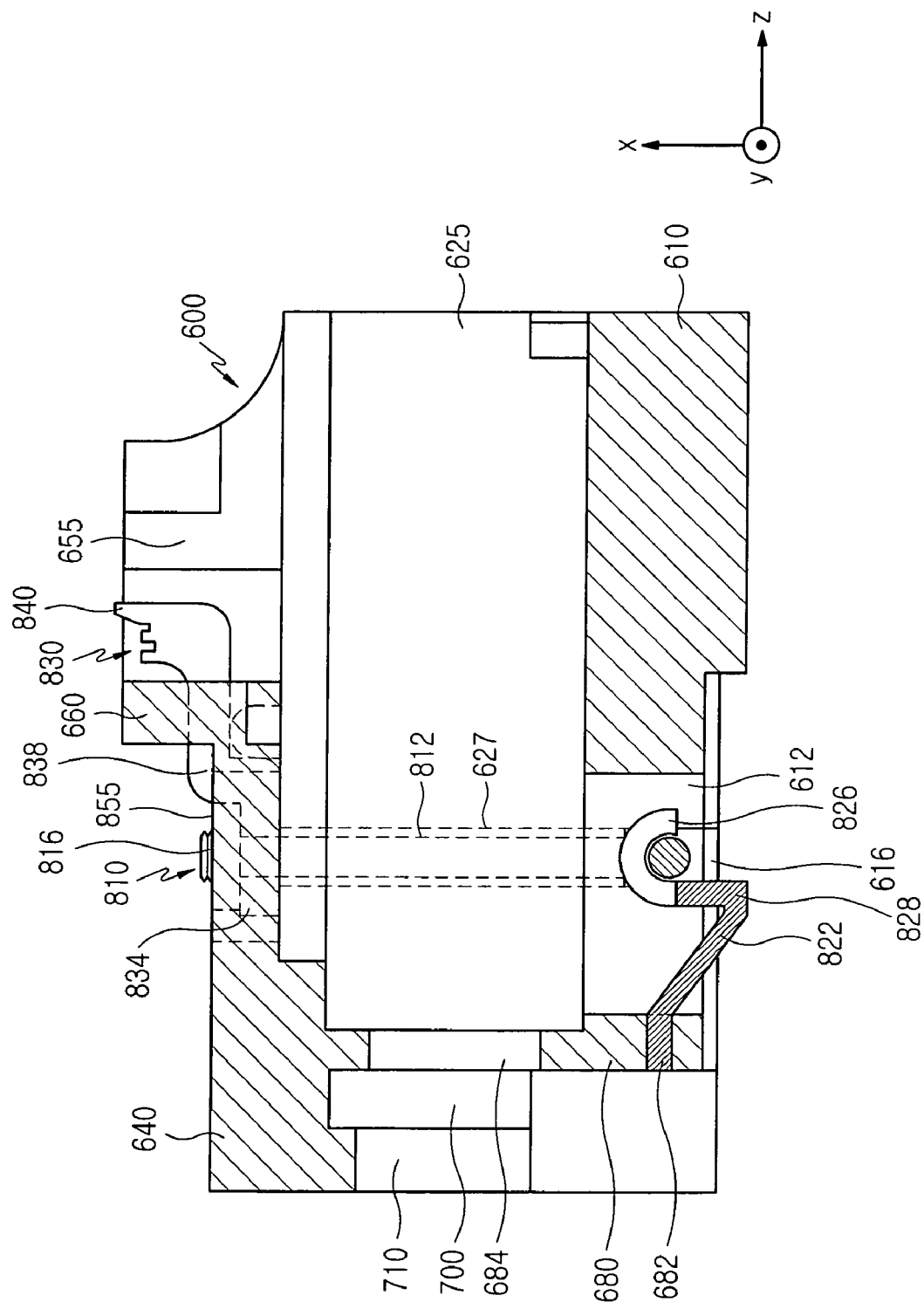
FIG. 19 is a cross-sectional view of the connector portion shown in FIG. 17, such as taken along D–D', which divides the width into halves.

FIG. 19 is a cross-sectional view of the connector portion 600 of the pluggable optical transceiver module shown in FIG. 17, such as taken along D–D', which divides the width into halves.

An assembling sequence of the bail clip 800 will now be described.

First, the bent portion of the elastic portion 822 of the lock pin 820 is inserted into the fourth hole 682 of the connector portion 600 and fixed.

Second, the main body 810 is inserted into the connector portion 600 so that the first and second fixing portions 814 and 816 of the main body 810 pass through the first and second holes 622 and 627 of the connector portion 600 and are exposed from the top of the first and second side portions 620 and 625, respectively.

Third, the bail 830 is assembled with the main body 810 so that the main body 810 passes through the first and second ring portions 832 and 834 of the bail 830.

Fourth, the first fixing member 850 is fixed to the first fixing portion 814 of the main body 810, and the second fixing member 855 is fixed to the second fixing portion 816 of the main body 810.

As shown in FIG. 19, the main body 810 passes through the second hole 627, and the second ring portion 834 of the bail 830 and the second fixing member 855 are piled up on the top of the second side portion 625. The bail 830 is laid on the second accommodating groove 644 and the second accommodating space 657, and the pressing portion 840 of the bail 830 is placed in the third accommodating space between the second projection 675 and the third stopper 655. The second connecting portion 838 of the bail 830 is laid on the second projection 675, and the pressing portion 840 is exposed from the top surface of the third stopper 655.A portion of the bail clip 800 placed in the second accommodating groove 644 is exposed out of the second accommodating groove 644.

The first and second hooking portions 824 and 826 of the lock pin 820 are hooked on the center portion of the main body 810, and the latching portion 828 of the lock pin 820 is exposed out of the third hole 612 of the connector portion 600.

Figure 20:
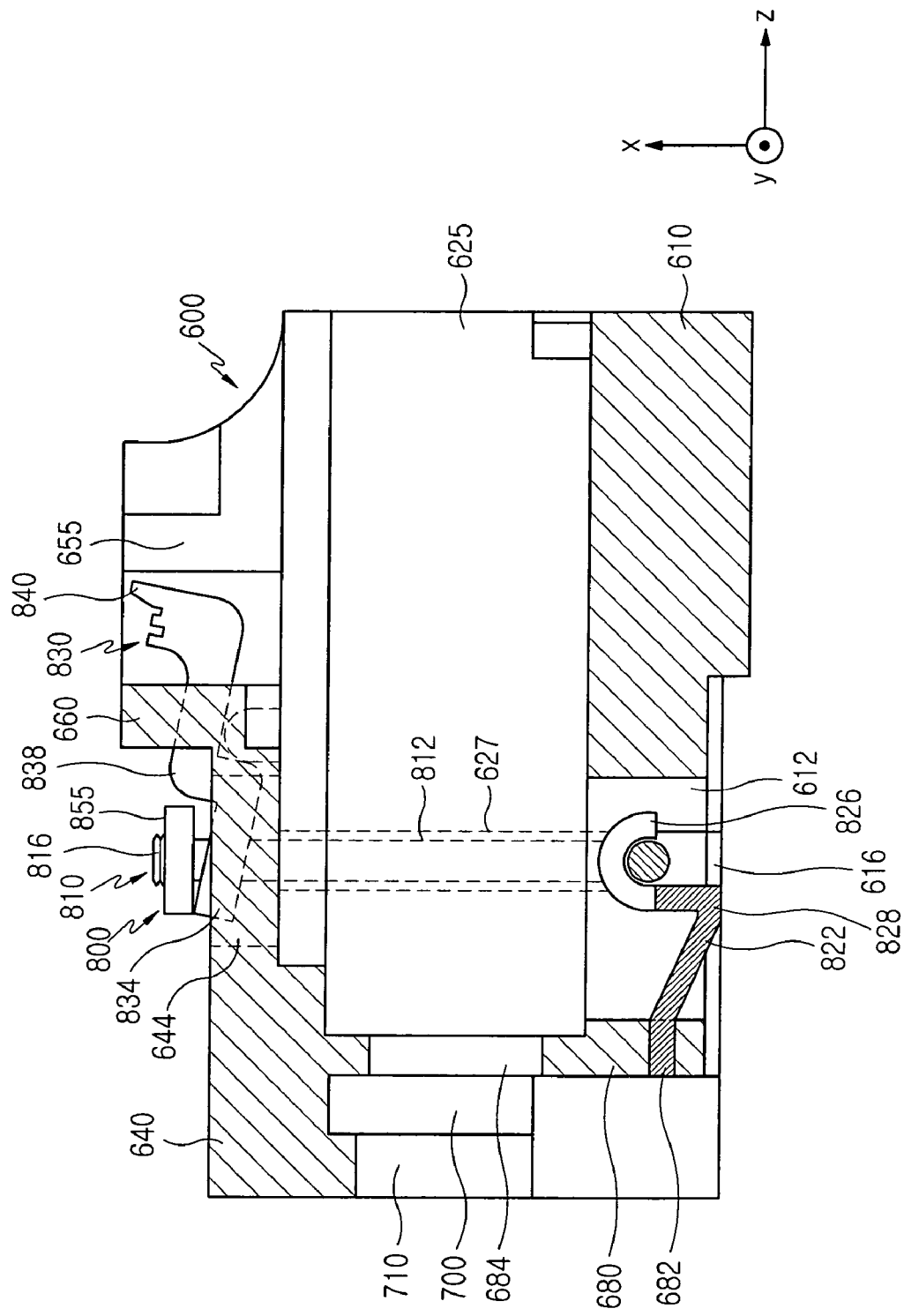
FIG. 20 is a cross-sectional view illustrating an operating method of the bail clip shown in FIG. 19.

FIG. 20 is a cross-sectional view illustrating an operating method of the bail clip 800 shown in FIG. 19. Since FIG. 19 is a cross-sectional view viewed in one direction, even if only a shown portion is described hereinafter, it will be understood that the same operation is also performed in a reverse direction.

As shown in FIG. 20, if a user pushes the pressing portion 840 of the bail 830 downward using a finger, the second ring portion 834 of the bail 830 is lifted to slope upward from the second side portion 620 according to the lever principle. Since the second ring portion 834 pushes the second fixing member 855 upward, the main body 810 fixed to the second fixing member 855 is moved upward. If the main body 810 moves upward, the latching portion 828 of the lock pin 820 is in the third hole 612 of the connector portion 600 by being moved upward by the first and second hooking portions 824 and 826 hooked on the main body 810. Before the movement, the latching portion 828 was exposed out of the third hole 612 of the connector portion 600; however, after the movement, the latching portion 828 is sunk into the third hole 612. When the latching portion 828 and the first and second hooking portions 824 and 826 move upward, the second elastic portion 822 is curved, and a force of restitution is generated. When the user takes the finger off from the pressing portion 840, the bail clip 800 is restored as shown in FIG. 19 by the force of restitution of the elastic portion 822.

Figure 21:
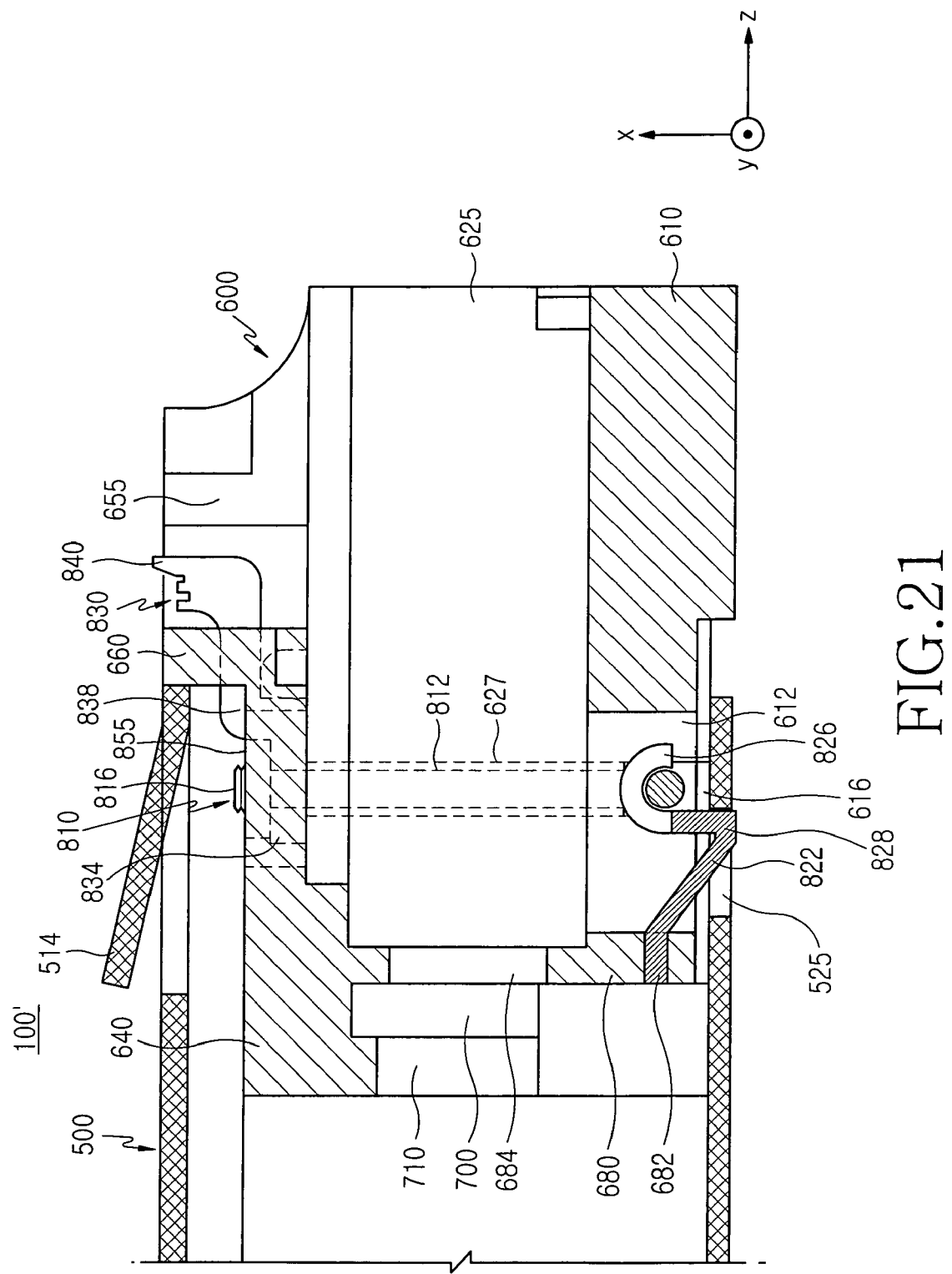
FIG. 21 is a cross-sectional view illustrating a state in which the pluggable optical transceiver module assembly according to the second embodiment of the present invention is engaged with a cage.
Figure 22:
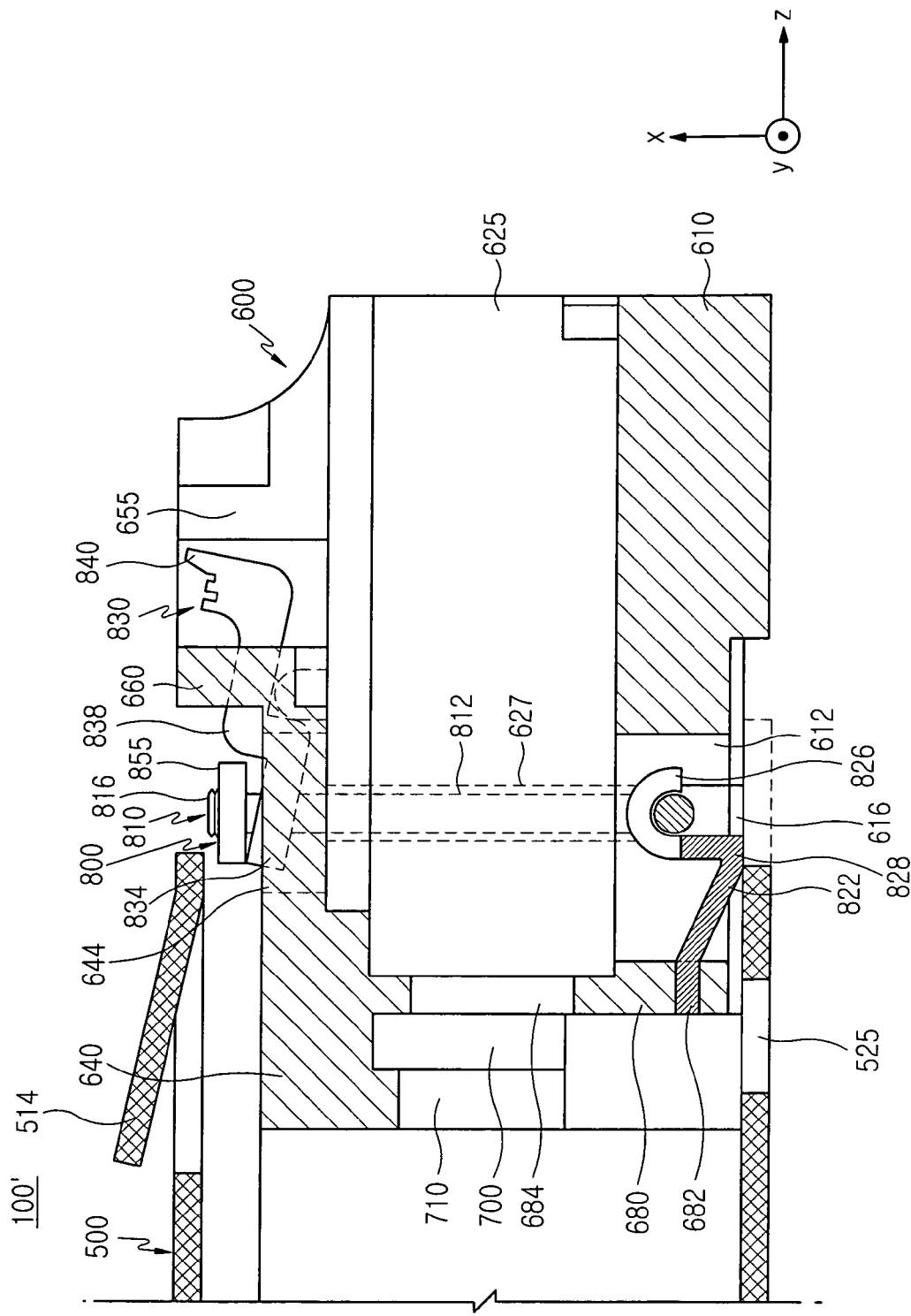
FIG. 22 is a cross-sectional view illustrating a state in which the pluggable optical transceiver module assembly shown in FIG. 21 is disengaged from the cage.

FIGS. 21 and 22 illustrate methods of engaging the pluggable optical transceiver module assembly with and disengaging it from a cage. FIG. 21 is a cross-sectional view illustrating a state in which the pluggable optical transceiver module assembly is engaged with the cage, and FIG. 22 is a cross-sectional view illustrating a process of disengaging the pluggable optical transceiver module assembly from the cage. Since the cage is equal to the cage 500 shown in FIG. 2, the same reference number is used. Also, since FIGS. 21 and 22 are cross-sectional views viewed in one direction, even if only shown portions are described hereinafter, it will be understood that the same operations are also performed in a reverse direction.

Referring to FIG. 21, the pluggable optical transceiver module assembly is inserted into the front end of the cage 500 from the rear end of the pluggable optical transceiver module assembly and engaged with the cage 500 by locking the lock pin 820 of the bail clip 800 in the locking hole 525. The top portion of the cage 500 is apart from the top end of the connector portion 600 in order to provide space for the bail clip 800 exposed out of the second accommodating space 657 in an engaging process of the pluggable optical transceiver module assembly. In the engaging process of the pluggable optical transceiver module assembly, the front end of the cage 500 is contacted to the elastic portion 822 of the bail clip 800.Since the elastic portion 822 slopes against the surface of the cage 500, if the pluggable optical transceiver module assembly is continuously pushed in the z-axis direction, the elastic portion 822 is curved, and the latching portion 828 is gradually sunk into the third hole 612. If the pluggable optical transceiver module assembly is further pushed in the z-axis direction, the latching portion 828 is completely sunk into the third hole 612, and if the movement is stopped since the first through third stoppers 660, 650, and 655 are contacted to the cage 500, the latching portion 828 is exposed out of the third hole 612 and locked in the locking hole 525.

Referring to FIG. 22, if a user pushes the pressing portion 840 of the bail 830 downward using a finger, the latching portion 828 is completely sunk into the third hole 612 as described above. When the user pulls the pluggable optical transceiver module assembly out in a state in which the latching portion 828 is completely sunk in the third hole 612, the pluggable optical transceiver module assembly is disengaged from the cage 500.

As described above, a pluggable optical transceiver module having a latching mechanism based on the lever principle and the pluggable optical transceiver module assembly using the same, can be unplugged from a cage in a state in which an optical connector is connected to the pluggable optical transceiver module.

While the invention has been shown and described with reference to a certain embodiments thereof, it will be understood by those skilled in the art that various changes in form and details may be made therein without departing from the spirit and scope of the invention as defined by the appended claims.

What is claimed is:

1. A pluggable optical transceiver module assembly comprising:
   a bail clip for providing a latching portion to be locked in a locking member; and
   an optical transceiver module having a connector portion including receptacle portions for accommodating external connectors,
   wherein the bail clip comprises:
   a main body assembled vertically through first and second ends of the connector portion;
   a lock pin, which is supported by a first end portion of the main body, has the latching portion exposed from or sunk in the second end of the connector portion, and provides a force of restitution to the bail clip; and
   a bail, one end of which is supported by a second end portion of the main body and which is laid on the first end of the connector portion in a lever shape, sinks the latching portion using the force of restitution of the lock pin by removing pressure from the other end.

2. The pluggable optical transceiver module assembly of claim 1, wherein the assembly is plugged in a cage, which is installed in a corresponding port of a host device and has the locking member.

3. The pluggable optical transceiver module assembly of claim 1, wherein the main body comprises:
   a body portion, which is assembled through the first and second ends of the connector portion and has a rod shape; and
   first and second supporting portions, which extend in both side directions from a second end portion of the body portion and support one end of the lock pin.

4. The pluggable optical transceiver module assembly of claim 1, wherein the bail comprises:
   a ring portion, which has a ring shape and through which the second end portion of the main body is assembled;

a connecting portion, which is bent and extends in a diameter direction from the side of the ring portion; and a pressing portion, which is connected to the end of the connecting portion and has folds on one end.

5. The pluggable optical transceiver module assembly of claim 1, wherein the lock pin comprises:

a latching portion having a plate shape;

an elastic portion, which extends to slope outward from the surface of the latching portion in a direction from a first end of the latching portion to a second end, a first end portion of which is fixed, and which provides a force of restitution to the bail clip; and first and second hooking portions, which curve in a C shape in a direction from the second end of the latching portion to the first end, extend apart from each other, and hook on the first end portion of the main body.

6. An optical transceiver module assembly, which is pluggable in a host device having a locking member, comprising:

a bail clip for providing a latching portion locked in a locking member;

a connector portion having a receptacle portion for accommodating an external connector; and a base portion, which extends from the connector portion and accommodates a circuit for interfacing the host device with an external connector, wherein the bail clip comprises:

a main body vertically assembled through first and second ends of the connector portion;

a lock pin, which is supported by a first end portion of the main body, has the latching portion exposed from or sunk in the second end of the connector portion, and provides a force of restitution to the bail clip; and a bail, one end of which is supported by a second end portion of the main body and which is laid on the first end of the connector portion in a lever shape, sinks the latching portion by giving pressure to the other end, and exposes the latching portion using the force of restitution of the lock pin by removing pressure from the other end.

7. The optical transceiver module assembly of claim 6, wherein the main body comprises:

a body portion, which is assembled through the first and second ends of the connector portion and has a rod shape; and first and second supporting portions, which are extended in both side directions from a second end portion of the body portion and support one end of the lock pin.

8. The optical transceiver module assembly of claim 6, wherein the bail comprises:

a ring portion, which has a ring shape and through which the second end portion of the main body is assembled;

a connecting portion, which is bent and extended in a diameter direction from the side of the ring portion; and a pressing portion, which is connected to the end of the connecting portion and has folds on one end.

9. The optical transceiver module assembly of claim 6, wherein the lock pin comprises:

a latching portion having a plate shape;

an elastic portion, which extends to slope outward from the surface of the latching portion in a direction from a first end of the latching portion to a second end, a first end portion of which is fixed, and which provides a force of restitution to the bail clip; and first and second hooking portions, which curve in a C shape in a direction from the second end of the latching portion to the first end, extend apart from each other, and hook on the first end portion of the main body.

10. The optical transceiver module assembly of claim 6, wherein the main body comprises a body portion, which is assembled through the first and second ends of the connector portion and has the shape of a U.

11. The optical transceiver module assembly of claim 10, wherein the bail comprises:

first and second ring portions, which have a ring shape and through which the second end portion of the main body is assembled;

a first connecting portion, which is bent and extended in a diameter direction from the side of the first ring portion and is laid on a first projection on the first end of the connector portion;

a second connecting portion, which is bent and extended in a diameter direction from the side of the second ring portion and is laid on a second projection on the first end of the connector portion; and a pressing portion, which connects the first and second connecting portions, has folds on one end, and has a rectangular block shape.

12. The optical transceiver module assembly of claim 6, wherein the connector portion further comprises:

a center portion, which equally divides the width of the connector portion into two halves;

first and second receptacle portions, which are formed in both sides of the center portion and accommodate external connectors, respectively;

a hole, which penetrates the center portion and in which the main body is inserted.

13. The optical transceiver module assembly of claim 6, wherein the connector portion further comprises:

a bottom portion located at the bottom of the connector portion;

first and second side portions, which are upward extended from both ends of the bottom portion, respectively;

a first hole, which penetrates the first side portion and in which a portion of the main body is inserted; and a second hole, which penetrates the second side portion and in which another portion of the main body is inserted.

14. A pluggable optical transceiver module assembly comprising:

an optical transceiver module having a connector portion including receptacle portions for accommodating external connectors; and a bail clip including:

a main body vertically assembled through first and second ends of the connector portion, a lock pin, which is supported by a first end portion of the main body, has a latching portion exposed from or sunk in the second end of the connector portion, and provides a force on the bail clip; and, a bail, one end of which is supported by a second end portion of the main body and which is laid on the first end of the connector portion in a lever shape, sinks the latching portion by giving pressure to the other end, and exposes the latching portion using the force of the lock pin by removing excess pressure from the other end.

15. The pluggable optical transceiver module assembly of claim 14, wherein the main body comprises:

a body portion, which is assembled through the first and second ends of the connector portion and has a rod shape; and first and second supporting portions, which extend in both side directions from a second end portion of the body portion and support one end of the lock pin.

16. The pluggable optical transceiver module assembly of claim 14, wherein the bail comprises:
   a ring portion, which has a ring shape and through which the second end portion of the main body is assembled;
   a connecting portion, which is bent and extends in a diameter direction from the side of the ring portion; and
   a pressing portion, which is connected to the end of the connecting portion and has folds on one end.

17. The pluggable optical transceiver module assembly of claim 14, wherein the lock pin comprises:
   a latching portion having a plate shape;
   an elastic portion, which extends to slope outward from the surface of the latching portion in a direction from a first end of the latching portion to a second end, a first end portion of which is fixed, and which provides a force of restitution to the bail clip; and
   first and second hooking portions, which curve in a C shape in a direction from the second end of the latching portion to the first end, extend apart from each other, and hook on the first end portion of the main body.

* * * * *